C. G. PRITCHARD.
COLLATING FEEDER.
APPLICATION FILED MAR. 21, 1916.

1,300,295.

Patented Apr. 15, 1919.
10 SHEETS—SHEET 1.

Witness
E. A. Jarvis

Inventor
Carl G. Pritchard
By his Attorney
Philip B. Peck

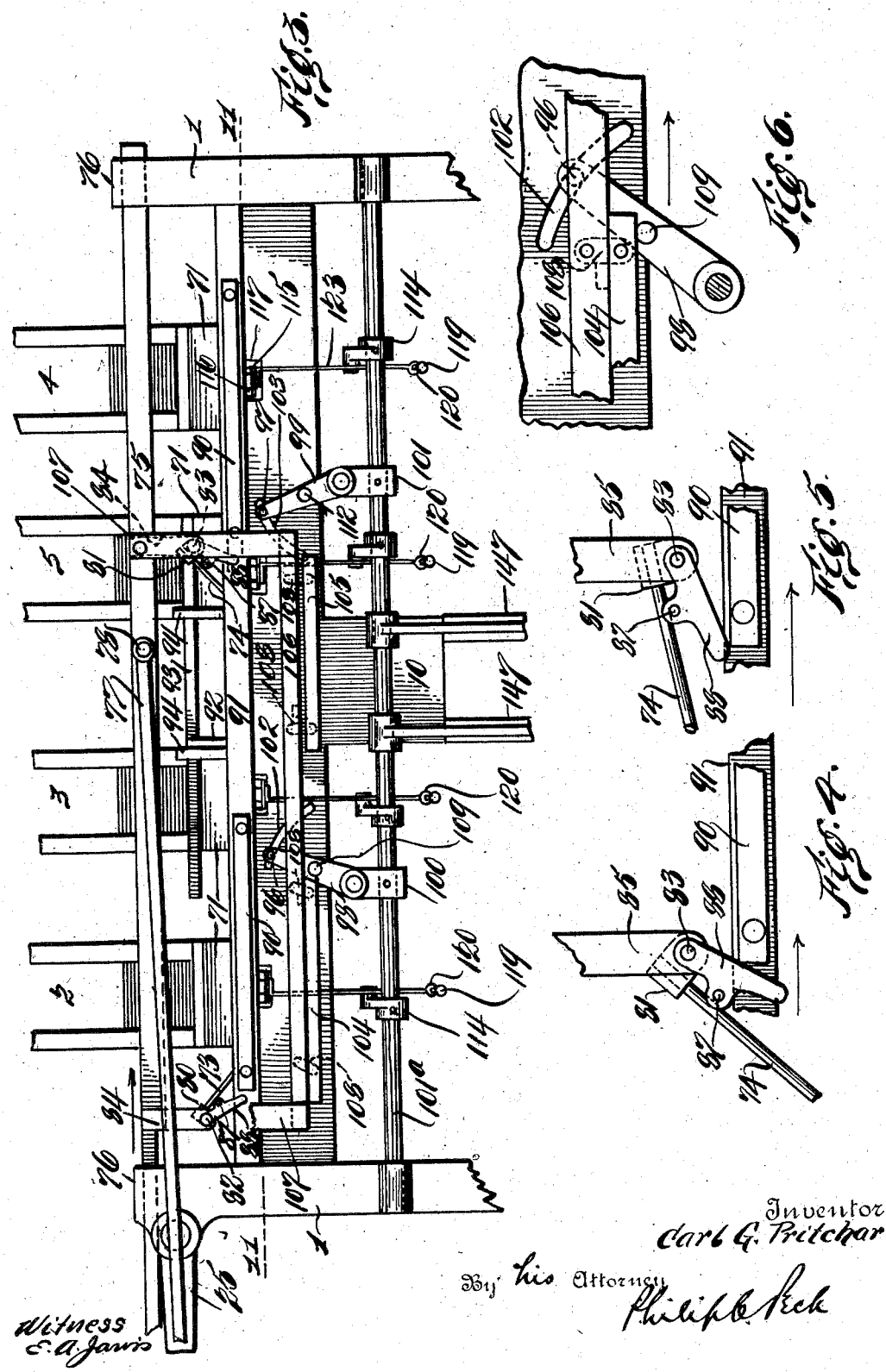

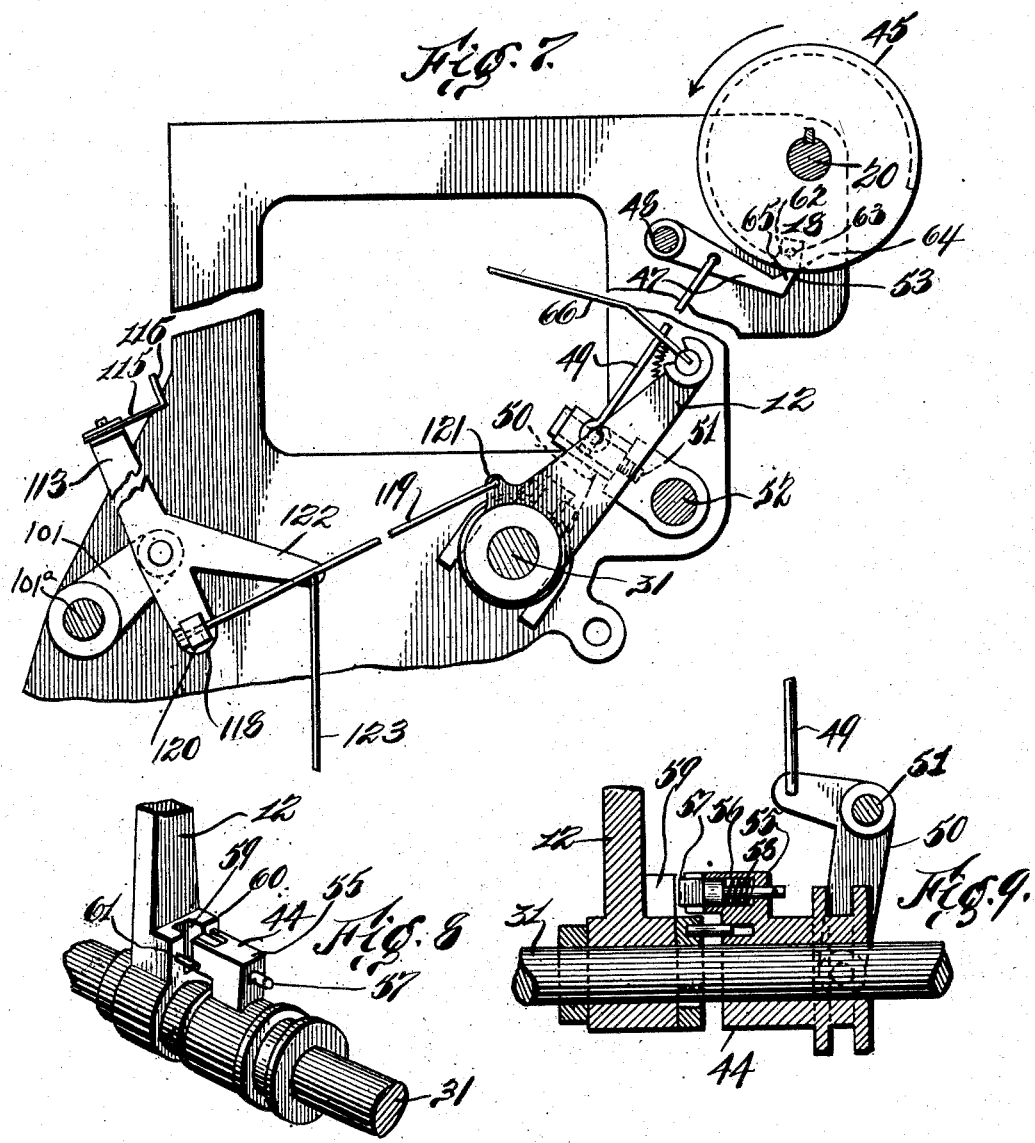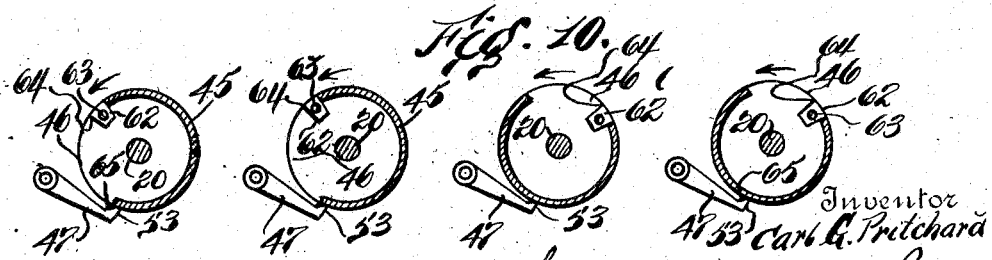

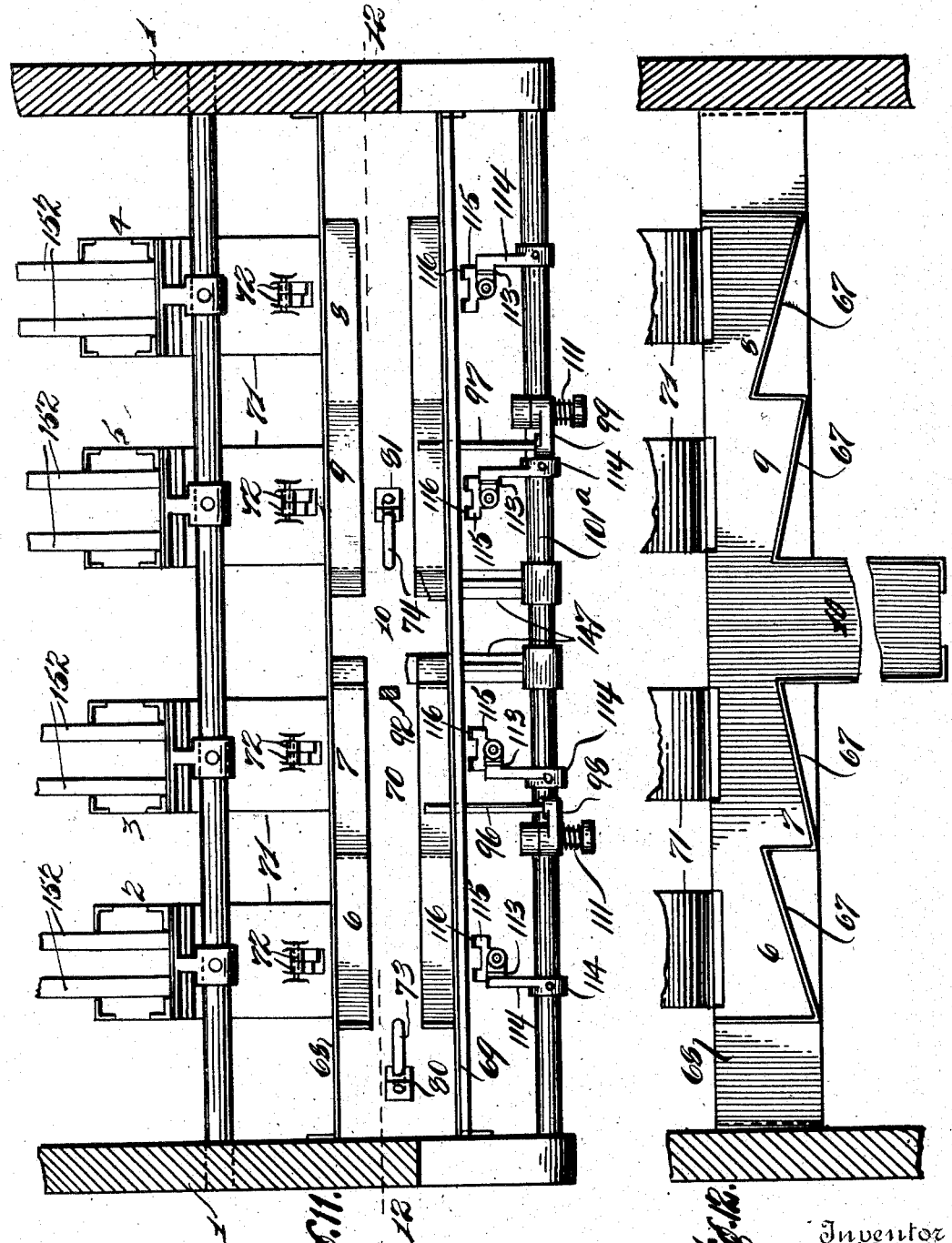

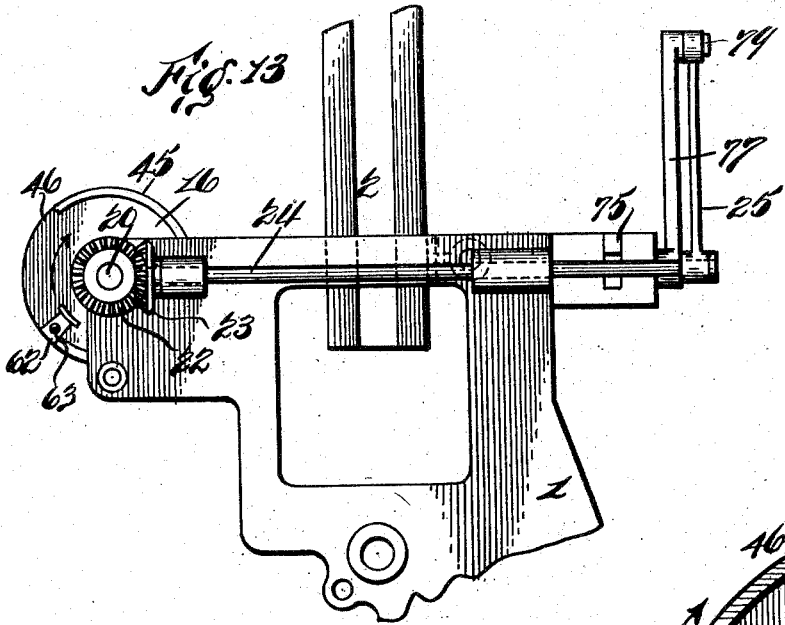
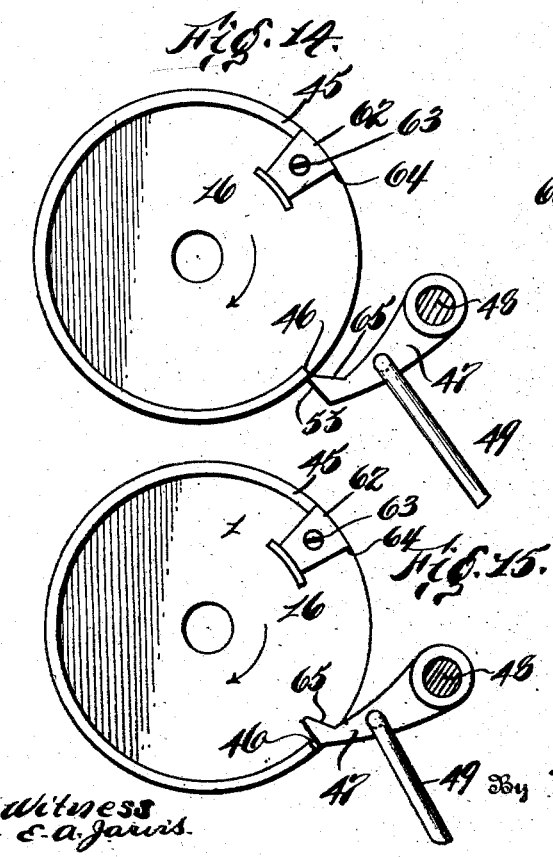
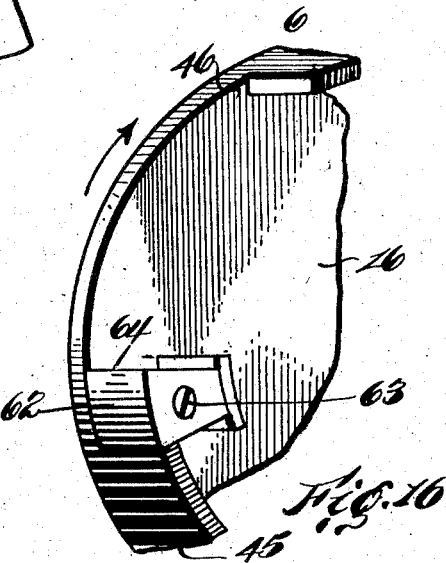
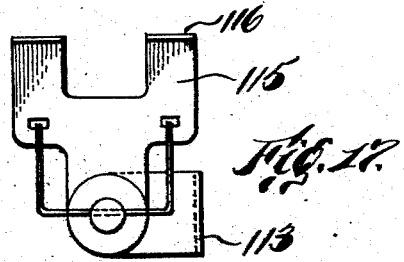

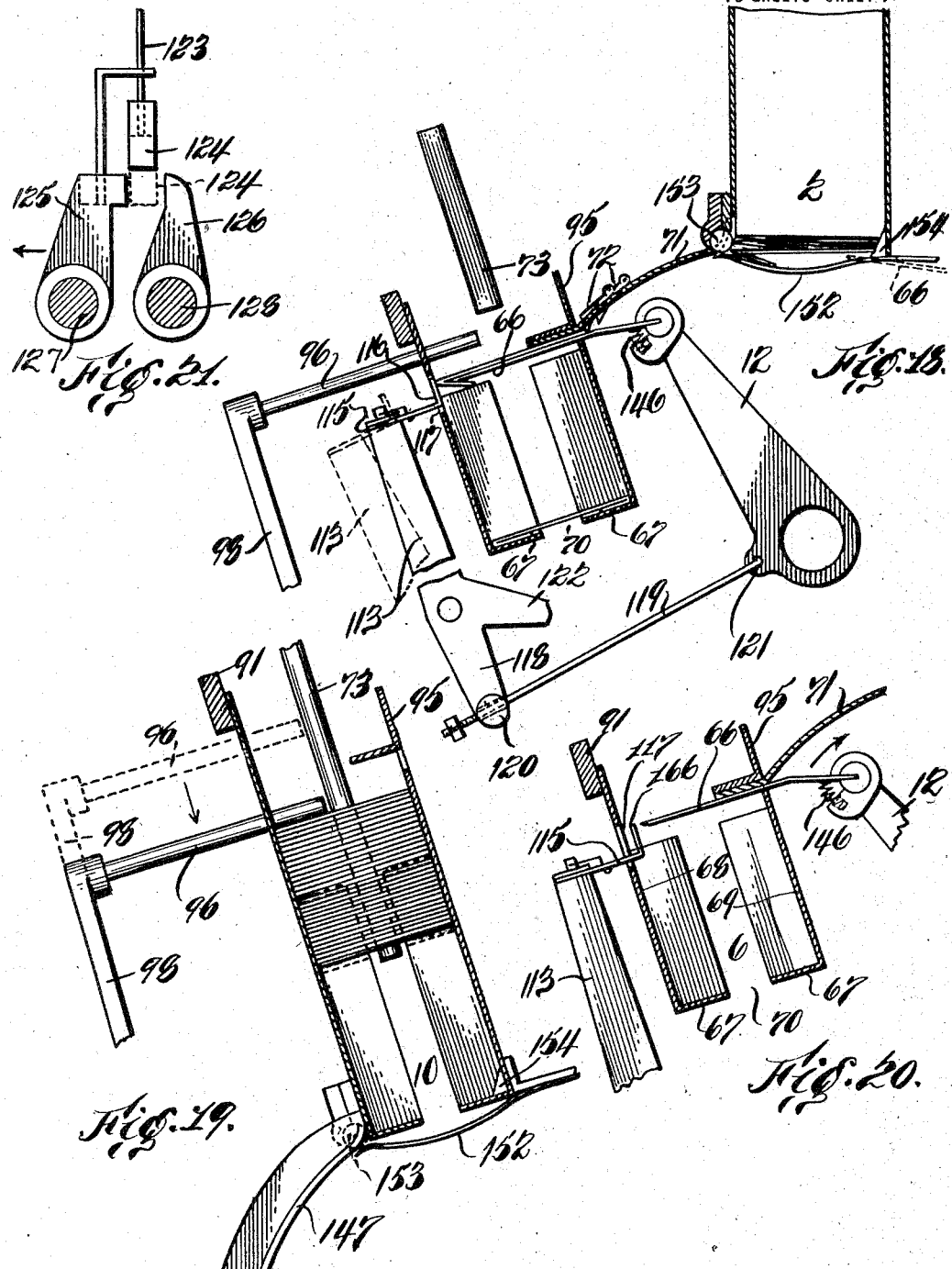

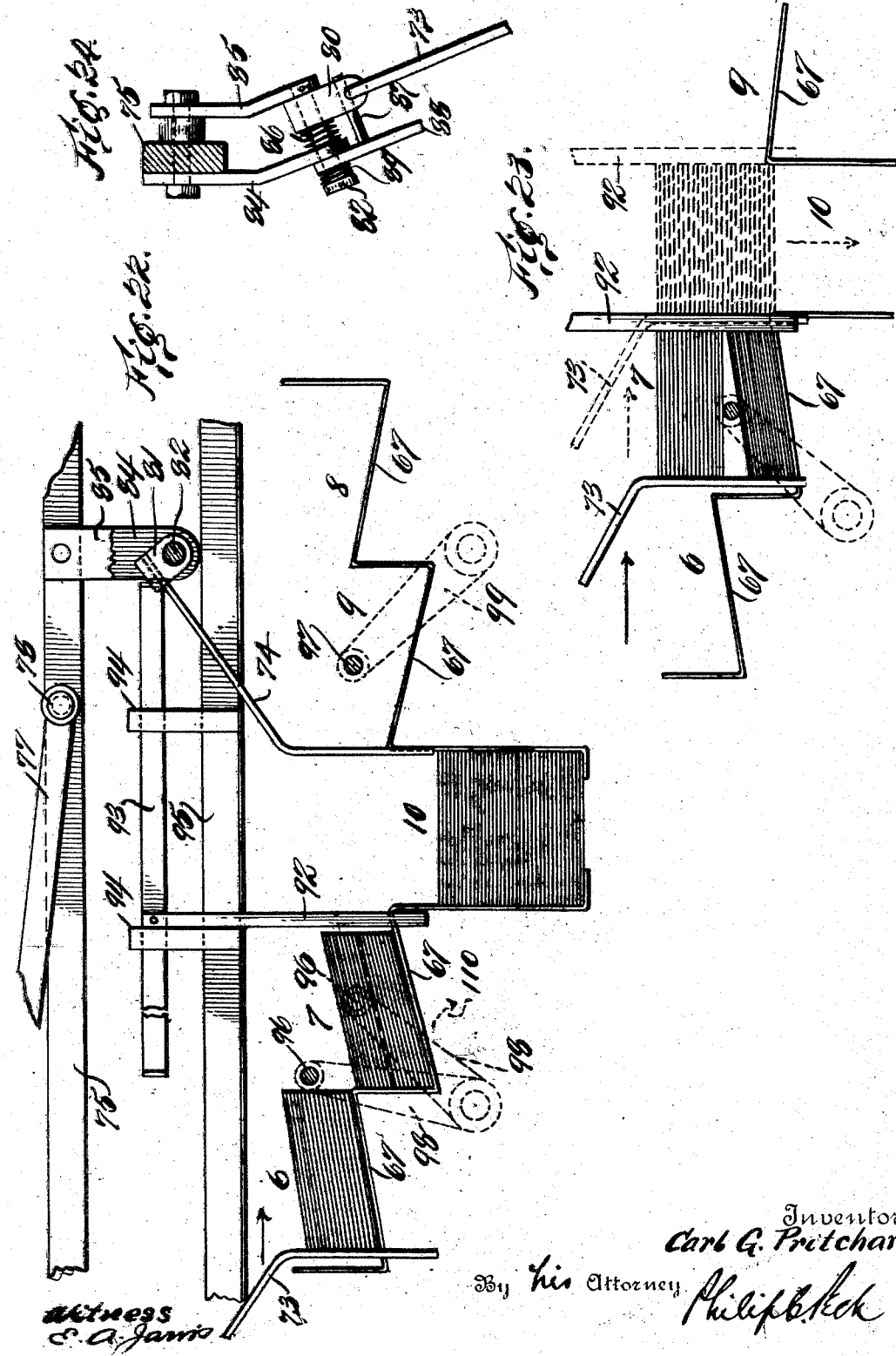

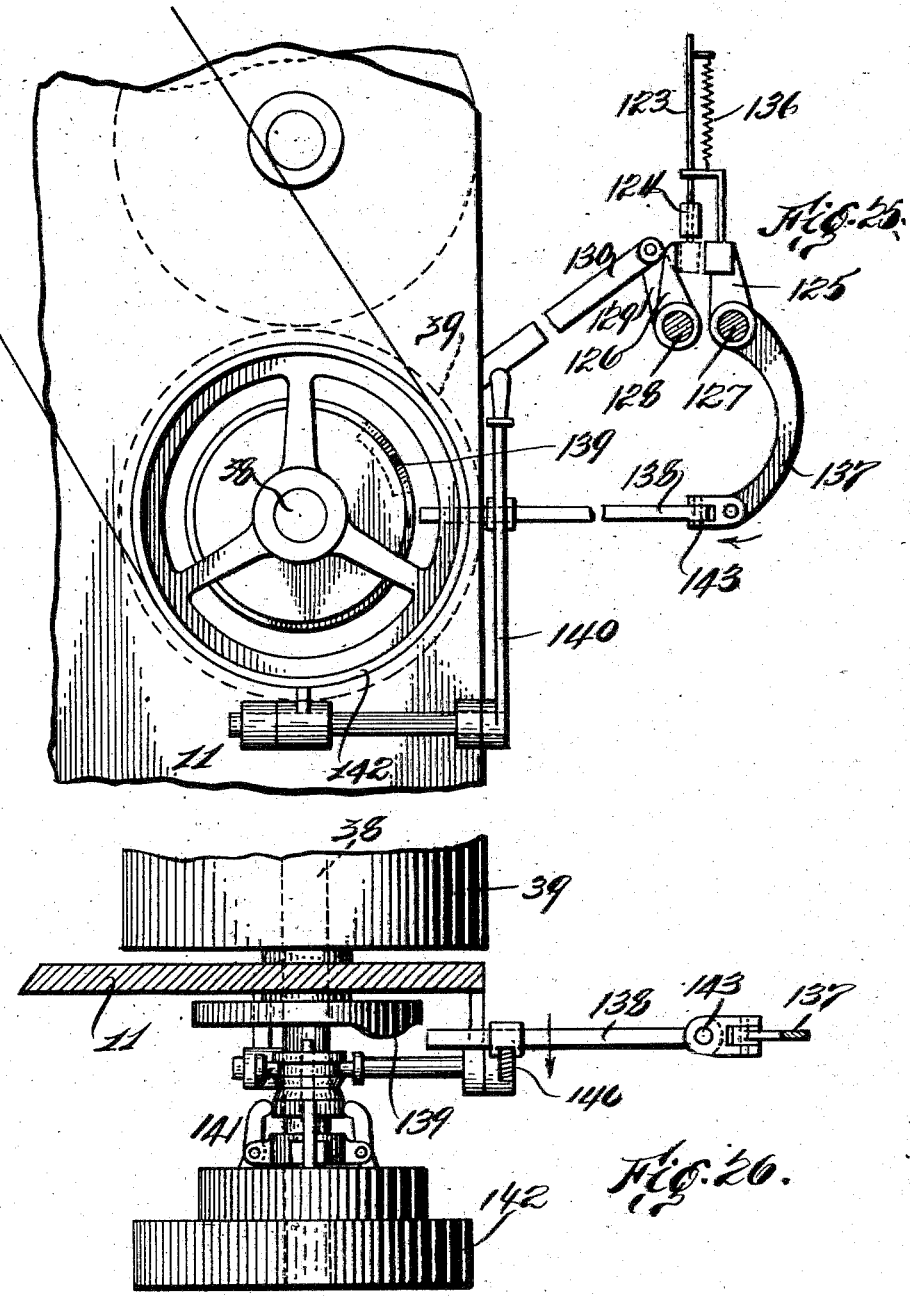

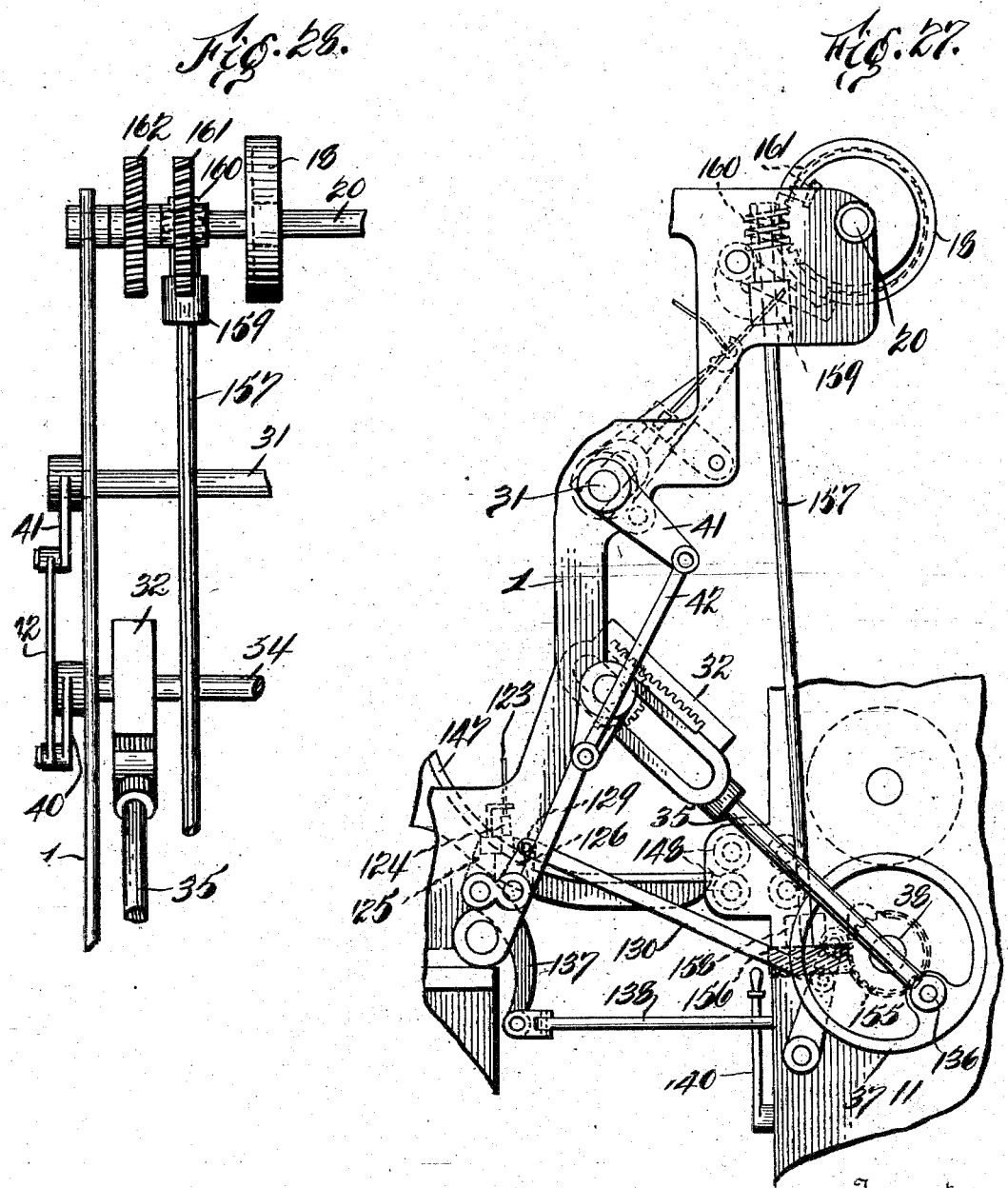

UNITED STATES PATENT OFFICE.

CARL G. PRITCHARD, OF WARREN, OHIO, ASSIGNOR TO THE HARRIS AUTOMATIC PRESS COMPANY, OF NILES, OHIO, A CORPORATION OF OHIO.

COLLATING-FEEDER.

1,300,295.  Specification of Letters Patent.  Patented Apr. 15, 1919.

Application filed March 21, 1916. Serial No. 85,653.

*To all whom it may concern:*

Be it known that I, CARL G. PRITCHARD, a citizen of the United States, and a resident of Warren, in the county of Trumbull and State of Ohio, have invented certain new and useful Improvements in Collating-Feeders, of which the following is a specification.

My invention relates, in its broadest aspect, to mechanisms especially designed to segregate and collate paper stock, for example, cards and envelops into a predetermined order, such stock being taken from a plurality of separate piles, and thereafter combining the segregated stock in predetermined order and feeding same to a printing-press or other imprinting device used in connection with printing-presses. In the United States Patent No. 1,113,483 issued October 13, 1914, I have described and claimed a printing-press for numbering and dating cards or envelops printed for weekly offerings in churches in which the dating mechanism was changed in each cycle of operation of the press, while the numbering mechanism was changed at predetermined points, or once in each cycle of operation of the dating mechanism.

The objects of my invention are, as a practical embodiment and employment of my invention, to provide a collating feeder for such numbering and dating printing-presses for weekly collection envelops for churches, which shall first segregate the proper number of envelops for each of the quarterly periods of the calendar year, the separate envelops for the respective quarters having different styles of printing thereon, and being retained in separate piles, from which my feeder takes the predetermined number of cards or envelops from each of the separate piles for each consecutive quarter, and thereafter combines same in their proper order to form an assorted package of 52 or 53 envelops, according to the calendar for the particular year.

A further object is to provide simple and highly efficient mechanism for handling the separated envelops as they are segregated and thereafter collated and brought to a common point in the feeder preparatory to delivery to the printing-press or like machine. These and other objects will be hereinafter fully set forth and particularly pointed out in the claims.

The accompanying drawings referred to herein, and forming a part thereof, show an embodiment of the invention in connection with a machine for numbering and dating envelops made according to my Patent No. 1,113,483, the same serving, in connection with the description herein, to fully explain the invention. But it will be understood that my improved feeder is not confined to use with this particular form of printing-press construction, since it is capable of being used with any kind of press which requires predetermined segregations and subsequent collation of impression-receiving material, before being acted upon by the press or other machine.

Fig. 3 is an enlarged front view of that portion of the device which collects the several piles of envelops and delivers them to a central magazine;

Figs. 4 and 5 are diagrammatic views illustrating the operation of one of the pile pushers;

Fig. 6 is a diagrammatic view illustrating the operation of one of the pile depressing devices;

Fig. 7 is an enlarged diagrammatic sectional view illustrating one of the envelop-extracting devices, means to control the operation thereof, and also a portion of the device for throwing out the clutch of the printing-press;

Fig. 8 is a perspective view of the lower portion of one of the envelop-extractors, supporting shaft therefor, and the clutch which operatively connects the extractor with the shaft;

Fig. 9 is a sectional view thereof, the clutch shifting fork being also shown;

Fig. 10 is a diagrammatic illustration of the relative setting of the master disks which control the operation of the envelop-extractors;

Fig. 11 is an enlarged sectional top plan view, the section being taken on a line 11—11 in Fig. 3, showing the several envelop hoppers and magazines;

Fig. 12 is a sectional view thereof, the section being taken on a line 12—12 in Fig. 11;

Fig. 13 is a side elevation of the upper portion of the collator looking from the right in Fig. 2;

Figs. 14 and 15 are enlarged diagrammatic views illustrating the operation of the master disks to control the operation of the envelop-ejectors;

Fig. 16 is an enlarged perspective view of a portion of one of the master disks;

Fig. 17 is an enlarged detail plan view of one of the clutch throw-out controlling devices;

Fig. 18 is an enlarged diagrammatic side view illustrating the operation of one of the envelop-ejectors;

Fig. 19 is a similar view illustrating the operation of one of the pile-depressing devices;

Fig. 20 is a diagrammatic view illustrating the operation of one of the clutch throw-out operating devices;

Fig. 21 is a detail view illustrating the mechanism for throwing out the clutch;

Fig. 22 is a diagrammatic end view illustrating the operation of the pile pushers;

Fig. 23 is a similar view illustrating one pusher as having delivered its piles of envelops to the central magazine;

Fig. 24 is a detail view illustrating the manner of supporting the pile pushers;

Fig. 25 is a diagrammatic view illustrating a portion of the clutch mechanism of the printing-press, and also the operating means therefor which is a part of the collator;

Fig. 26 is a plan view thereof, the operating device therefor being omitted;

Fig. 27 is a fragmentary side view showing a modified form of driving mechanism for the pusher cam shaft; and Fig. 28 is a fragmentary end view thereof looking from the right in Fig. 27.

Similar numerals refer to similar parts throughout the several figures.

Figure 1:
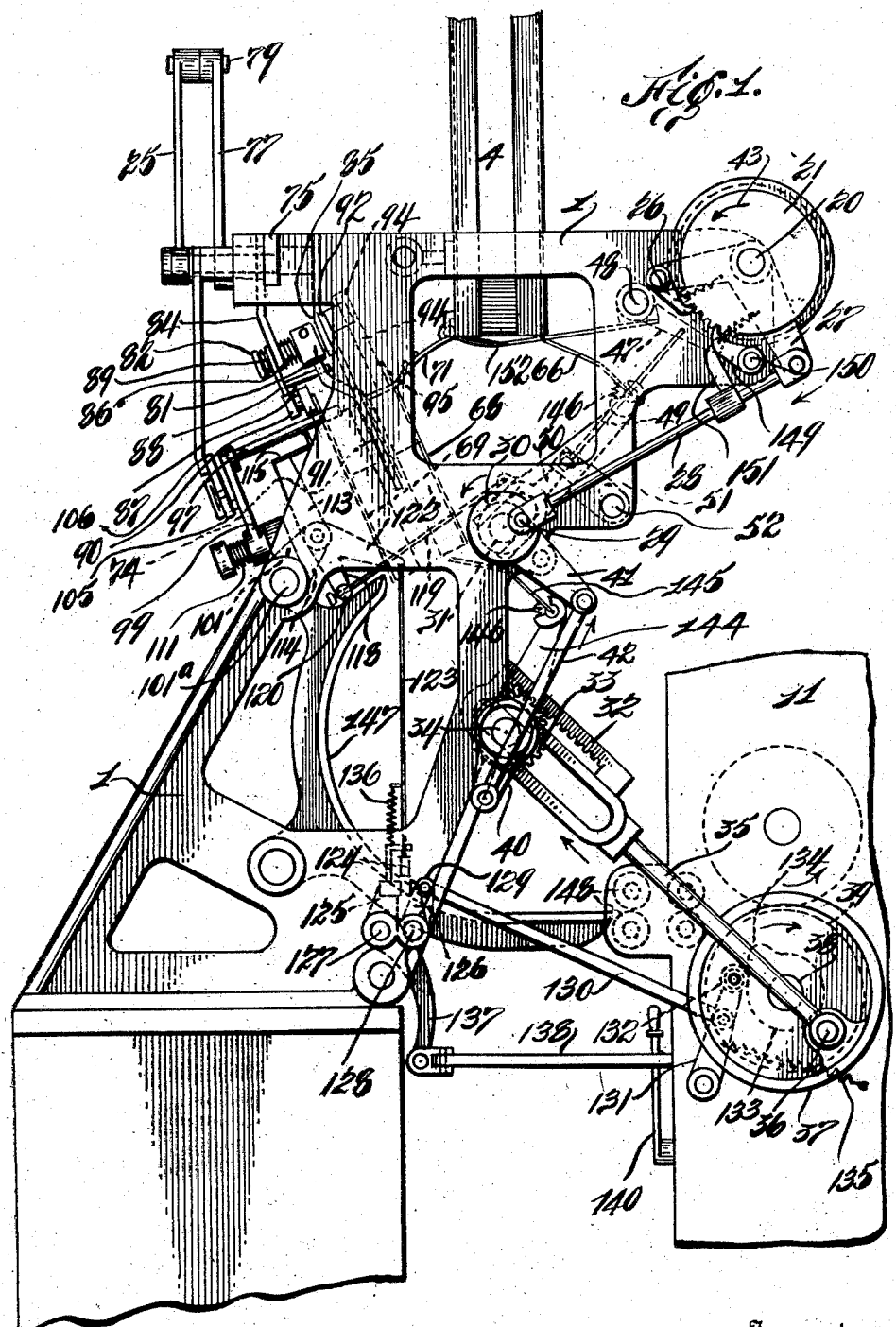
Figure 1 is a side elevation of the collator, a portion of a printing-press being also indicated.

Referring to the drawings, the collating feeder or "collator" consists of the side frames 1 which are secured together by suitable cross-bars to produce a rigid structure, which shall support the various parts and mechanisms constituting the feeder proper. The side frames support, in this instance, four hoppers 2, 3, 4 and 5, as shown in Figs. 2 and 3, in which the cards or envelops to be printed, numbered or dated, are stacked. In the present embodiment of my invention, the hoppers 2, 3, 4 and 5, as positioned in my feeder, correspond to, and represent, the first, second, third and fourth quarterly periods of the calendar year. The respective cards or envelops for the four hoppers 2, 3, 4 and 5, as shown in Fig. 3, are placed in the respective hoppers by an attendant as fast as the piles diminish, and the envelops are carried one by one, in order, from the hoppers 2, 3, 4 and 5, to their corresponding magazines, 6, 7, 8 and 9 respectively, as shown in Figs. 11 and 12, the floors of the respective magazines being inclined upwardly toward a central magazine 10, from which the assorted envelops, in stacked formation, are consecutively delivered, one by one, to the printing-press 11, as shown in Fig. 1, which may be the printing-press shown in my Patent No. 1,113,483, before mentioned.

My feeder is particularly arranged to collate the envelops from each hopper, each magazine 6, 7, 8 and 9 receiving its quota of envelops for the quarter corresponding to its respective hopper; in other words, the piles for each magazine are segregated and arranged in the different magazines according to the number of Sundays in the quarterly period of three months, being either 12, 13 or 14, according to the calendar for the year. The form of mechanism for carrying or ejecting the predetermined number of envelops from each hopper, comprises a series of ejectors 12, 13, 14 and 15, arranged to coact with the hoppers 2, 3, 4 and 5 respectively, as shown in Fig. 2. For example, should there be twelve Sundays in the first quarter of the year, the ejector 12 would reciprocate twelve times, thereby carrying twelve envelops from the pile in the hopper 2; if there should be thirteen Sundays in the next quarterly period, the ejector 13 for the magazine 3 would operate thirteen strokes. In like manner, the ejectors 14 and 15, for the magazines 4 and 5, are arranged to operate so that each will make as many strokes in coaction with their respective magazines 4 and 5, as there are Sundays in the respective quarterly periods of the calendar year, which each set of hoppers, magazines and ejectors represents. The total number of strokes of the four ejectors 12, 13, 14 and 15 will be either fifty-two or fifty-three, according to the number of Sundays in the year.

The number of strokes made by the several ejectors 12, 13, 14 and 15 is controlled by master disks 16, 17, 18 and 19 respectively, shown in Fig. 2, and the form and structure of these disks are illustrated in detail in Figs. 14, 15 and 16. The disks 16, 17, 18 and 19 are mounted and keyed to the shaft 20 journaled in the frame 1, one end of which carries a ratchet gear 21, as shown in Figs. 1 and 2, and the other end carries the miter gear 22 meshing with the miter gear 23 mounted on the shaft 24, which carries a crank arm 25, as shown in Fig. 13. The shaft 20 has an intermittent step-by-step rotation which is produced by the operation of the ratchet-pawl 26 carried by the bell-crank lever 27 loosely mounted on the shaft 20, as shown in Figs. 1 and 2.

Figure 2:
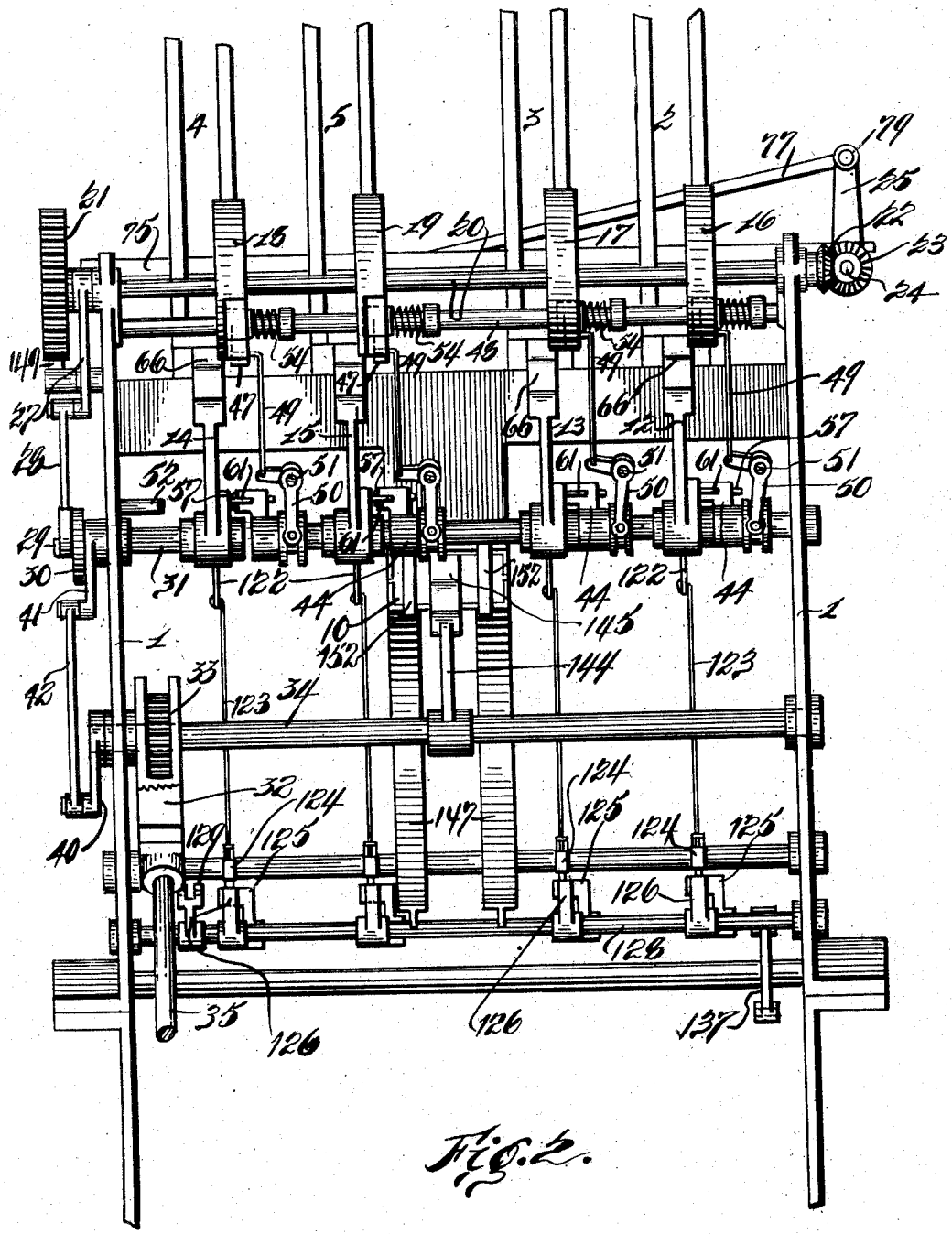
Fig. 2 is a rear view of the device.

The bell-crank lever 27 is connected by a link 28 which engages the crank-pin 29 on the crank-disk 30 carried by the shaft 31, journaled in the frame 1, as shown in Figs. 1 and 2. The shaft 31 is actuated by means of a rack 32 which engages the gear 33 on the shaft 34, journaled in the frame 1, as shown. The rack 32 is carried on the upper end of the link 35, which is connected to the crank-pin 36 secured to the wheel 37, mounted on the shaft 38, which supports the impression-cylinder 39 of the printing-press 11. To actuate the shaft 31, the shaft 34 carries an arm 40 which is connected to the arm 41 on the shaft 31 by the link 42. During the operation of the press 11, the rack 32 will be reciprocated in each cycle of operation of the press, thereby imparting to the shaft 34 an oscillating movement which will, in turn, be communicated to the shaft 31 by the devices just described. Furthermore, the oscillation of the shaft 31 will produce a similar movement of the bell-crank lever 27 loosely mounted on the shaft 20, as has been hereinbefore described.

The oscillating movement of the lever 27 is designed to be sufficient only to cause the pawl 26 to advance the ratchet gear 21 a single tooth in the direction of the arrow 43 shown in Fig. 1, during each stroke of the lever 27.

The ejectors 12, 13, 14 and 15, are similarly constructed, as shown in the figures, and are loosely mounted upon the shaft 31. These ejectors do not reciprocate so as to carry envelops from their respective hoppers unless connected to the shaft 31 by means of clutches 44 (shown in Figs. 8 and 9), the operation of the individual clutches being controlled by its corresponding master disk mounted on the shaft 20. To cause the clutches 44 to operate, so as to connect the ejectors with the oscillating shaft 31, the master disks 16, 17, 18 and 19 are each provided with an annular flange 45, as shown in Figs. 14, 15 and 16, which has an opening 46 formed therein, which coöperates with the arms 47, loosely mounted on the cross-bar 48 secured in the frame 1, as shown in Fig. 2. The arms 47, through links 49, are connected to their respective clutch shifters 50 pivoted to blocks 51 mounted on the bar 52, as shown in Fig. 7. The operation of the clutches 44, by being moved to the left in Fig. 2, is caused by the upward movement of the arms 47 when the ends 53 of said arms 47 are forced into the opening 46 of the respective disks 16, 17, 18 and 19, by springs 54 coiled about the bar 48, as shown in Fig. 2.

Referring to Figs. 8 and 9, the oscillating clutches 44 are formed to have clutch dogs 55 formed in their upper portion, which dogs have sockets 56 adapted to hold the engaging pins 57, which are yieldingly held in their respective sockets 56 by coil springs 58. The pins 57 are adapted to engage with suitably shaped openings 59 formed in the blocks 60, which carry the ejectors 12, 13, 14 and 15, so as to connect the corresponding oscillating clutches 44 with the ejectors. The safety pins, or stops, 61, are suitably mounted in the blocks 60 to enable the respective ejectors to remain in their inactive, or rest, position when required, since should any one of the ejectors be displaced or pushed partially forward from any cause while in its idle position on the shaft 31, the first return movement of the corresponding clutch 44, which is constantly oscillating, would contact with the respective stop 61 and cause the corresponding ejector to return to its idle position.

When any one of the clutches 44 engages its corresponding ejector 12, 13, 14 or 15, this particular ejector will be reciprocated forwardly and backwardly by the oscillating shaft 31, and will continue its reciprocation until the corresponding controller arm 47 is carried out of the opening 46 formed in the flange 45 of the corresponding master disk, the arm 47 resting on the flange 45, as shown in Fig. 14. It is apparent that the rotation of the master disks forces the arms 47 out of the opening 46 through contact of the arms with the flanges 45. The openings 46, in each disk, are about one quarter of the circumference or ninety degrees, which will equal thirteen teeth on the gear wheel 21, which has 52 or 53 teeth in its periphery, according to the number of Sundays in the calendar year. Hence it follows that while the arms 47 are contained within the openings 46, as shown in Fig. 15, the respective ejectors will be connected with the oscillating shaft 31 for thirteen reciprocations or strokes, which will cause thirteen envelops to be carried from the hopper alining with the particular ejector which is being actuated. The arm 47 will be forced downwardly and out of engagement with the opening 46, thereby disengaging the coöperating clutch 44 from its ejector, at the end of the thirteenth stroke. In Fig. 7 the ejector 12 is shown in its normal or idle position, and the respective disks 16, 17, 18 and 19 are set on the shaft 20 to cause the respective ejectors 12, 13, 14 and 15 to come to rest at the end of the thirteenth stroke in the position shown in this figure, that is, after the thirteenth reciprocation has been completed.

To vary the number of strokes for any of the four ejectors, since it is obvious that in some instances one or more of the ejectors should make only twelve strokes, while the others should be actuated 13 or 14 times, blocks 62 are provided at one end of the openings 46, as shown in Figs. 14, 15 and 16, which are detachably secured to the disks 16, 17, 18 or 19 by set screws 63. The blocks 62 serve to shorten the openings 46 and lengthen the peripheries of the flanges 45, whereby the operation of an ejector controlled by a disk having its opening shortened by a block 62 will be less than that of another ejector controlled by a disk the opening in which is unblocked. In other words, the number of strokes for any particular ejector will depend altogether upon the lengths of the flanges and openings of the different disks through the different blocks 62. For example, should the ejector 12 require only twelve strokes, as would be predetermined, the disk 16 would be suitably blocked to meet the requirements for such twelve strokes, and in like manner each of the remaining disks 17, 18 and 19 would be blocked in a similar manner to cause its respective ejector 13, 14 and 15 to make the requisite number of strokes to complete the fifty-two or fifty-three strokes, according to the number of teeth in the ratchet gear 21. It is obvious that if the openings 46 are unblocked, it would require fourteen strokes of the lever 27 to rotate the shaft 20 sufficiently to cause the edge 64 of the opening 46 to engage the beveled edges 65 of the arms 47 in the rotation of the disks in the direction shown in Figs. 14 and 15. Consequently the particular ejector controlled by the arm would make fourteen reciprocations before that particular arm was lifted. A blocked opening would manifestly require less movement to bring the edge 64 in contact with the beveled edge 65. Hence the duration of the operations of the respective ejectors 12, 13, 14 and 15 is directly determined and controlled by the lengths of the openings 46 in the corresponding master disks.

To separate and carry the individual envelops from the different hoppers 2, 3, 4 and 5, each ejector is provided at its upper end with a yieldable finger 66, as shown in Figs. 7, 18 and 20, which is adapted to engage the flaps of the successive envelops, the pile of envelops in the different hoppers being stacked therein with their flaps down, as shown in Fig. 18. At each forward stroke of an ejector, the finger 66, yieldingly mounted on the upper end thereof, will engage the flap of the lowermost envelop and carry same forwardly from the hopper to the corresponding alining magazine, as shown in Fig. 18, the particular envelop in this instance being carried by the ejector 12 from the hopper 2 to the magazine 6. When the finger 66 is withdrawn from engagement with the flap upon the backward stroke of the ejector, the envelop will fall by gravity through the magazine 6 and rest on the bottom members 67, as shown in Fig. 18. The separate magazines 6, 7, 8 and 9 are preferably constructed with side plates 68 and 69, and bottom members 67 having an opening 70 therebetween for a purpose to be hereinafter described. As is shown in Fig. 12, the bottom members 67 of the magazines 6, 7, 8 and 9 are angularly disposed and upwardly inclined toward the central magazine 10. To enable the successive envelops to be properly guided from their different hoppers to their respective magazines, curved plates or guides 71 are provided, shown in Figs. 18 and 20, which have pivoted latches 72 secured thereto to prevent a backward movement of the segregated envelop when the fingers 66 are withdrawn from the envelop flaps by the backward stroke of the ejector.

As is shown in Fig. 22, two of the magazines, in this instance, 6 and 7, have received their full quota of envelops from the hoppers 2 and 3 respectively, while the magazines 8 and 9 are empty. Since my collator and feeder is particularly designed to collate envelops for the separate quarterly periods of the calendar year, it is necessary to fill each of the magazines 6, 7, 8 and 9, from the the alining hoppers 2, 3, 4 and 5, with the requisite predetermined number of envelops for the particular quarters as has been hereinbefore set forth, and finally collect the separate piles in successive order to form the assorted package for the whole year. To avoid all unnecessary movements and idle strokes in my feeder, to the end that it may operate rapidly and in an efficient manner, the hoppers for the separate piles of envelops for the four quarters of the year, are preferably arranged as shown in Figs. 12 and 22, on either side of the central magazine 10 in which the envelops are finally assembled in order to be delivered to the printing-press 11. In the present embodiment of my invention, the envelops for the first quarter are segregated and assembled in magazine 7, for the second quarter in magazine 6, for the third quarter in magazine 9, and for the last quarterly period of the year in magazine 8.

It is apparent that the different magazines should not be filled simultaneously since the time required to deliver the proper quota of envelops already assembled in two of the magazines on one side of the magazine 10, to such central magazine, is utilized to fill the remaining magazines on the opposite side. For example, while the envelops in magazines 6 and 7 are being laterally pushed and delivered to the magazine 10, magazines 8 and 9 will be receiving their predetermined number of envelops from the hoppers 4 and 5 respectively. As shown in Fig. 22, the first and second quarter magazines (7 and 6) have been filled up with their quota of envelops which are ready to be delivered to the magazine 10.

To deliver these assembled envelops to this central magazine 10, push fingers 73 and 74 are provided, as shown in Figs. 11 and 22. These fingers are carried by the slide 75, shown in Figs. 3 and 22, mounted in guides 76 on the frame 1. The slide 75 is laterally reciprocated by the link 77 connected at one end to the slide 75 at 78, as shown in Fig. 3, and at the opposite end at 79 to the crank-arm 25, as shown in Fig. 2. The fingers 73 and 74 are carried by blocks 80 and 81 respectively pivotally supported by pins 82 and 83 respectively carried by hangers 84 and 85 respectively, as is shown in detail in Fig. 24, which are affixed to the slide 75. The fingers 73 and 74 are respectively lowered at proper times by the springs 86 coiled about the pins 82 and 83, and are raised at the proper times by pins 87 carried by arms 88 loosely mounted on the pivot pins 82 and 83, as shown in Fig. 3. The springs 89 serve to force the arms 88 downwardly, the said arms 88 being forced upwardly to raise the fingers 73 and 74 by the fixed rails 90 shown in Figs. 3, 4 and 5, which are carried by the crossbar 91 secured at its ends to the frame 1. The openings 70, between the bottom members 67 of the different magazines, are adapted to receive the lower ends of the push fingers 73 and 74 when the fingers are lowered, as shown in Figs. 22 and 23.

During the operation of the ejectors 12, 13, 14 and 15, the slide 75 will be reciprocated laterally, carrying with it the fingers 73 and 74, but these fingers will be alternately raised and lowered through such movement by the rails 90 and springs 86, as has been described. In Fig. 22, the slide 75 has completed its movement to the left, and the finger 74 has delivered the envelops assembled in the magazines 8 and 9 to the central magazine 10. During the reciprocation of the slide 75 from the right position toward the left, the finger 74 was lowered and the finger 73 was raised; in this movement of the slide and fingers, the magazines 6 and 7 were being filled with their quota of envelops, and by the time the finger 74 has reached the limit of its movement, the magazines 6 and 7 will be filled with their predetermined number of envelops from the hoppers 2 and 3. The finger 73 was maintained in its upraised position by its arm 88 riding along the rail 90, the pin 87 carried by this arm contacting with, and holding, the finger 73 uplifted, as shown in Fig. 5. Approximately at the time the slide 75 finishes its stroke to the left, the arm 88 will drop off the rail 90, thereby allowing the spring 86 to force the finger 73 downwardly and to the rear of the pile of envelops in the magazine 6, as shown in Fig. 22. The action of these parts, as just described, is shown in detail in Fig. 4. During the return movement of the slide 75, the envelops in the second quarter pile (magazine 6) will be pushed onto the envelops of the first quarter pile (magazine 7), as shown in Fig. 23, and during this stroke the finger 74 will be raised by its arm 88 riding upon the rail 90, as shown in Fig. 5, thereby permitting the magazines 8 and 9 to receive their predetermined quota of envelops. It is obvious that both the raising and lowering of the fingers 73 and 74 will be a quick action, since the arms 88 are caused to drop off the rails 90 quickly through the force of the springs 89. A continued movement of the finger 73 to the right will push both piles of envelops from the magazines 6 and 7, to a position over the central magazine 10, into which the envelops will drop, as shown in Fig. 23.

In order to keep the two piles of envelops in perfect alinement as the second quarter envelops from magazine 6 are superimposed over the first quarter envelops in magazine 7, a vertical alining bar 92 is provided which is carried by a slide 93 mounted in guides 94 on the rail 95, which is secured at its ends in the frame 1, as shown in Figs. 3 and 22. The opposite ends of the slide 93 are engaged by the two hangers 85 to reciprocate the bar 92 the width of the magazine 10, as shown in Fig. 23. Therefore, this bar 92 and fingers 73 and 74 serve to aline the piles in proper position before they drop into the magazine 10. The bottoms of the respective magazines are inclined to permit the piles from the magazines 6 and 8 to be readily positioned over the respective piles formed in magazines 7 and 9; also to cause the segregated envelops to fall and aline against the outer walls of the magazines.

To enable the envelops in the outer magazines 6 and 8 to be transferred inwardly over the envelops in the magazines 7 and 8 respectively, when the final delivery movement to the central magazine 10 takes place, it becomes desirable, and, in fact, necessary, to depress the already assembled quota of envelops in the inner magazines 7 and 9. This may be accomplished by the following mechanism: Laterally projecting pins 96 and 97 are secured to the upper ends of the pivotal arms 98 and 99 respectively, which are shown in Figs. 3, 11 and 22. These arms 98 and 99 are carried by blocks 100 and 101 respectively, which are affixed to the bar 101ª secured in the frame 1, as shown in Fig. 11. The pins 96 and 97 pass through curved slots 102 and 103 respectively, formed in the front wall of the magazines 6, 7, 8 and 9. The arms 98 and 99 are depressed by bars 104 and 105 respectively, which are carried by the rail 106 secured to hangers 107 affixed to the slide 75, as shown in Figs. 1 and 3. The bars 104 and 105 are carried by links 108 pivoted to the rail 106, as shown in Fig. 3. When moved toward the right, the bar 104 will be caused through the links 108 to strike the pin 109 on the arm 98, after which a continued movement of the slide 75 will cause the arm 98 to swing downwardly in the direction of the arrow 110 shown in Fig. 22, causing the pin 96 to depress the pile of envelops in the magazine 7 to the dotted line position shown in Fig.

22, thereby permitting the pile in magazine 6 to be readily transferred to the superimposed position through the movement of the finger 73. As is shown in detail in Fig. 6, the bar 104 will finally ride over the pin 109 on the arm 98 and hold this arm depressed. At the end of the delivery stroke the bar 104 will ride off the pin 109 allowing the spring 111 (shown in Fig. 11) to restore the arm to its normal position. The same operation occurs with respect to the arm 99 carrying the pin 97; when the slide 75 moves toward the right, the bar 105 will strike the pin 112 on the arm 99, but will not depress the arm 99, since the bar 105 will swing to the left until it passes over this pin 112, there being no stop-pins to prevent this bar 105 from swinging in this direction.

To procure the alternate operation of the two sets of ejectors for the magazines on either side of the magazine 10, the disks 18 and 19 are keyed upon the shaft 20 so that the position of the openings 46 therein is in advance of the openings 46 in the disks 16 and 17. This enables the disks 16 and 17 to operate at the same time, whereby the ejectors 12 and 13 are simultaneously actuated to fill their respective magazines 6 and 7. Meanwhile the disks 18 and 19 are set to cause their ejectors 14 and 15 to remain idle while the magazines 6 and 7 are receiving their predetermined quota. It follows, therefore, that one set of magazines (6 and 7) will be filling while the piles from the other set are being delivered to the magazine 10, and vice versa.

It is also necessary to provide against the failure of an ejector, should any particular ejector fail to carry an envelop from its hopper, for any reason, that is, should the ejector make a stroke without carrying the envelop, whereby the printing-press may be stopped without throwing off the impression, since it is obvious the consecutive numbering mechanism should not be thrown out of time with respect to the envelops that are being fed to the press. To accomplish this result, a clutch throw-out mechanism is provided which comprises the fingers 113 shown in Figs. 1, 3 and 18, carried by blocks 114 secured to the bar 101ª. The fingers 113 are pivoted to said blocks 114 and are provided with pivotally mounted guards 115 (Fig. 17) having flanges 116 which are adapted to pass through openings 117 cut in the front wall of the magazines to contact with an envelop, as shown in Figs. 3 and 18. The arm 118 of each finger is connected to its corresponding ejector by a link 119, one end of which passes loosely through the pivotal block 120 on the arm 118, as shown in Fig. 18. The other end of the link 119 is connected at 121 to the corresponding ejector arm, in this instance, the ejector 12. Each finger 113 has secured to it a second arm 122 which carries the link 123 provided, at its lower end, with the block 124, shown in Fig. 21, arranged to be contained within the space between the arms 125 and 126. The arm 125 is carried by the normally stationary shaft 127 and the arm 126 by the rock shaft 128, as shown in Figs. 1 and 21. The rock-shaft 128 carries the arm 129 which is connected by the link 130 to the lever 131 secured on the press 11. The lever 131 supports the roller 132 which rides upon the disk 133 having a cam-spot 134, as shown in Fig. 1. The cam-spot 134 is timed to rock the shaft 128 to cause the arm 126 mounted thereon to move toward the arm 125 to close the space between the ends of the arms once in every cycle of operation of the press 11. The spring 135 serves to pull back the lever 131 so that the roller is always in contact with the periphery of the disk 133, as shown in Fig. 1.

During the reciprocation of the ejectors, the fingers 113 will rise and fall in unison with the ejector strokes, and if there is an envelop in contact with these fingers when the guards 115 enter into the magazines through the openings 117, the block 124 will not descend to be contained within the space between the upper ends of the arms 125 and 126. However, should an ejector fail to separate and carry forward an envelop, the fingers 113 would, through the action of the spring 136, shown in Figs. 1 and 25, enter the magazines as shown in Fig. 20, and the block 124 would descend to the dotted line position shown between the arms 125 and 126 in Fig. 21. When the arm 126 is rocked forwardly the arm 125 would also be rocked in the direction of the arrow shown in Fig. 21, causing the arm 137 secured thereto to be rocked in the direction shown by the arrows in Figs. 1 and 25. This movement of the arm 137 in the direction shown, would cause the end of the arm 138 pivotally secured thereto, to move into the path of the cam-spot 139 shown in Figs. 25 and 26. This engagement with the cam-spot 139 would move the arm 138 outwardly, as shown by the arrow in Fig. 26, thereby actuating the clutch lever 140 outwardly to release the clutch mechanism 141, which would stop the press without throwing-off the impression.

It is apparent, therefore, through the operation of these detecting fingers in connection with the respective magazines, if an ejector fails to separate and feed an envelop from its hopper, that the press will be stopped without throwing off the impression, and without disturbing the delivery operation from the central magazine. The links 119 which connect each ejector with its coöperating finger 113 are slidably mounted in their blocks 120 to permit free play. This allows the fingers 113 to be pulled downwardly by their springs 136 if the particular ejector fails to segregate and feed forward an envelop to the corresponding magazine. When an envelop is properly fed to the magazine, the guards 115 will contact with its forward edge and come to rest, and will thereafter be restored to their normal position by the links 119, just before the ejectors reach their normal position.

As my improved collating feeder is not to be confined for use with any particular type of printing-press or other like machine, the form of clutch with its coöperating parts is not at all essential. The clutch mechanism 141, which I have shown herein, in connection with the pulley 142, is a well known form of clutch that does not require any detailed description. The arm 138 is pivoted at 143 to the arm 137 in order that it may be moved outwardly by the cam-spot 139 to actuate the clutch lever 140 to stop the press 11.

The envelops assembled in the magazine 10 are taken one by one therefrom by the ejector 144 carried by the oscillating shaft 34, as shown in Figs. 1 and 2. The ejector 144 carries on its outer end a yielding finger 145 which will engage the flap of the lowermost envelop in the magazine 10 in the same manner as the fingers 66 mounted on the ejectors 12, 13, 14 and 15. These fingers 66 and 145 are pivotally mounted upon their respective ejector arms and are pressed upwardly against the guides or tracks of the respective magazines by coil springs 146, as shown. The ejector 144 carries the envelop along the curved tracks 147 to the feed rolls 148, thereafter to be forwarded to the cylinders of the press 11, as shown in Fig. 1.

To prevent the ratchet-gear 21 from being drawn backwardly too far by the pawl 26, and to lock same so that the ratchet-gear may not gain an extra tooth on account of over-throw, I have provided a latching pawl 149 pivoted in the frame 1 at 150. This pawl 149 so coacts with the inclined teeth of the gear 21, as to be successively forced out of engagement with such inclined teeth by a tooth-by-tooth movement, when the gear 21 is intermittently rotated in the direction of the arrow 43. To prevent the pawl 149 from jumping when my feeder is running at high speed, the stop 151 is so mounted on the link 28, as shown in Fig. 1, that it will contact with and hold the pawl 149 in locked position at the completion of the upward stroke or movement of the link 28. This device enables the two pawls 26 and 149 to be locked in the teeth of the ratchet-gear 21, thereby rendering the operation of my feeder positive.

As shown in Figs. 18 and 19, each of the hoppers 2, 3, 4 and 5, and also the magazine 10, is provided with yielding plates 152 extending along the bottom on either side of the respective ejectors. These plates 152 serve to maintain the flaps of the lowermost envelop in proper position to be engaged by the ejectors operating between the plates, and the envelops are carried by the ejectors between the ends of the plates 152 and friction and retarding rollers 153 arranged across the front bottom of the hoppers and magazine 10. Opposite the rollers 153, in the hoppers and magazine 10, I preferably secure the beveled plates 154 to the back bottom part of these hoppers and magazine 10, which plates act to fan the lower envelops, as shown in Fig. 18, thereby enabling the respective ejectors to act to better advantage in feeding the separate envelops.

Referring to Figs. 27 and 28, I have here shown a modified form of driving mechanism for the shaft 20, which is intermittently rotated in the construction shown in the former figures. In this modified form, the shaft 20 is continuously rotated or driven, thereby placing less strain on the operating mechanism of my feeder when working at high speeds. The modified embodiment of my invention as shown comprises the following mechanism to accomplish a slow, continuous rotation of the shaft 20: Mounted on the impression-cylinder shaft 38 of the press 11, is the spiral gear 155 which engages with the spiral gear 156 secured to the lower end of the vertical worm-shaft 157, which is journaled in blocks 158 and 159 affixed to the frame 1, the shaft 157 making a complete revolution with each revolution of the press. The upper end of the shaft 157 has formed thereon the worm 160, which enmeshes with the worm-gear 161 adjustably mounted on the shaft 20. The worm-gear 161 has formed in its periphery 52 teeth or threads, and adjacent thereto on the shaft 20 is likewise adjustably mounted the worm-gear 162 having 53 teeth or threads in its periphery. Either of the two worm gears 161 and 162 may be moved laterally on the shaft 20, and secured in operative engagement with the worm 160, as required by the calendar for the particular year. It is obvious that with each cycle of the press 11, the worm shaft 157 makes a single revolution, which will slowly rotate either of the worm-gears 161 and 162 a single tooth or thread by a continuous movement; this mechanism, therefore, accomplished the same purpose and function as the intermittently rotating ratchet-gear 21 with its fifty-two or fifty-three teeth in its periphery, but, instead of the intermittent rotation of the shaft 20 with its thereon mounted master disks, a slow continuous movement is imparted to this shaft and its connected devices, which is of advantage when the feeder is operating at high speeds.

The operation of my feeder is substantially as follows: When the press 11 is operated, a reciprocating motion is given to the link 35 in the direction of the arrow shown in Fig. 1, thereby imparting to the shaft 34 an oscillating movement which carries the ejector 144 from the position shown in Fig. 1, downwardly to the feed rolls 148, and back again to its initial position with each cycle of operation of the press 11. Each of the four hoppers 2, 3, 4 and 5 has received its supply of cards or envelops to be segregated and carried to the respective magazines 6, 7, 8 and 9, and ultimately to the central magazine 10, to be there carried by the ejector 144 to the feed-rolls 148 of the press 11. The master disks 16, 17, 18 and 19 have been mounted and keyed to the shaft 20, the pair of disks 16 and 17 being positioned alike, and also the pair of disks 18 and 19, with the openings 46 of the respective pairs 16, 17, and 18, 19, having a different relationship on the respective peripheries to enable the ejectors 12 and 13 to operate simultaneously while the ejectors 14 and 15 are idle, and vice versa, as has heretofore been explained.

As the ratchet gear 21 is intermittently rotated, by the pawl 26, in the direction of the arrow shown in Fig. 1, the arms 47 cooperating with the disks 16 and 17 are simultaneously forced, by their springs 54, into the openings 46 of these two disks, which movement operatively connects the ejectors 12 and 13, loosely mounted on the oscillating shaft 31, through the respective individual clutches 44, to this shaft 31. This clutch connection for the ejectors 12 and 13, with the shaft 31, causes them to be reciprocated forwardly and backwardly with each cycle of the press to segregate and carry forward an envelop from each of the hoppers 2 and 3 respectively with each stroke of the ejectors 12 and 13, depositing same in the magazines 6 and 7 respectively. This action of the ejectors 12 and 13 continues as long as the arms 47 connected therewith remain within the openings 46 of the disks 16 and 17 respectively. When the disks 16 17 have been rotated sufficiently through the pawl 26 and its operating mechanism, to carry the edge 64 of the respective openings 46 against the beveled edge 65 of the arms 47, these arms 47 will be moved downwardly and out of engagement with respective openings 46 of the disks 16 and 17, causing the ends 53 of the arms 47 to be forced from the openings 46, and to ride on the peripheries of the flanges 45, as shown in Fig. 10. This movement releases at once the clutches 44 for the ejectors 12 and 13, and they simultaneously and immediately cease feeding the individual envelops from the hoppers 2 and 3 to the magazines 6 and 7 respectively, and come to their idle position, having separated and carried forward their predetermined quota of envelops from the hoppers 2 and 3 respectively.

While the ejectors 12 and 13 are idle, the ejectors 14 and 15 come into operation in due course when the arms 47 operatively connected therewith are moved within the respective openings 46 of the disks 18 and 19, which actuate the ejectors 14 and 15 to carry the segregated envelops from the hoppers 4 and 5 to the magazines 8 and 9 respectively, in the same manner as has been described with relation to the ejectors 12 and 13; therefore it will not be necessary to repeat the operation for the two ejectors 14 and 15.

When the predetermined quota of envelops has been stacked in the magazines 6 and 7, as shown in Fig. 22, ready to be transferred to the magazine 10, the slide 75 has been moved to its left position, as shown in Figs. 3 and 22, thereby bringing the bar 92 into the position shown in Fig. 22, the finger 74 having just completed its full movement to the left, while the finger 73 has been raised, whereby the assembled piles in magazines 8 and 9 have been pushed to the left so as to drop into the central magazine 10 as shown. The finger 73 has now been lowered to the rear of the pile in the magazine 6, by having its arm 88 ride off the left-hand rail 90, as shown in Fig. 3. The initial movement of the rail 75 toward the right will cause the bar 104 to engage with the pin 109 on the arm 98, thereby depressing the pin 96, as shown in Fig. 22, which action will compress the pile of envelops in the magazine 7 sufficiently to enable the pile in the magazine 6 to be readily transferred to their superimposed position through the movement of the finger 73 toward the right, as is clearly illustrated in Fig. 23, the envelops from both piles now assembled in magazine 7 alining against the bar 92. Meanwhile, the finger 74 will be held uplifted by its arm 88 riding on the right-hand rail 90, as shown in Fig. 5, which allows the magazines 8 and 9 to receive their predetermined quota of envelops from the hoppers 4 and 5 through the operation of the ejectors 14 and 15 controlled by the disks 18 and 19 respectively. As the slide 75 moves farther toward the right, the finger 73 is moved into the dotted line position shown in Fig. 23, and, at the same time, the left-hand hanger 85 engages the left end of the slide 93, which pushes the bar 92 to the right across the width of the magazine 10, and the superimposed piles from the magazines 6 and 7 will drop into the central magazine 10, all as shown in dotted lines in Fig. 23. The bar 92 is thereby placed in position to aline the succeeding piles from the magazines 8 and 9 in connection with the successive movement to the left of the finger 74 which actuates and pushes the two piles of envelops from the magazines 8 and 9 in the same manner as the finger 73, as has been heretofore explained. The pin 97 depresses the pile of segregated envelops in magazine 9 in the same manner as the pin 96 operates upon the pile in magazine 7, and the action of this pin 97 is timed with relation to the movement of the finger 74 to the left in the same relationship as the action of the pin 96 is timed with respect to the movement of the finger 73 to the right, the respective pins and fingers coacting for the purpose heretofore described.

It is manifest that the alternate operation of the above-mentioned devices in connection with the two sets of ejectors 12 and 13 on the one hand, and the ejectors 14 and 15 on the other, enables me to fill one set of magazines (for instance magazines 6 and 7), while the assembled piles from the other magazines 8 and 9 are being delivered to the central magazines 10, and vice versa.

While this part of my feeder is segregating the envelops from the respective hoppers and collating same in the magazine 10, the ejector 144 is carrying the individual envelops in their predetermined order from the lower end of the magazine 10, with each cycle of the press, so that there is a continuous feed of the assorted envelops along the tracks 147 to the feed rolls 148 through the constant reciprocation of this ejector 144 in its oscillating movement about the shaft 34, this ejector at all times delivering an envelop to the feed rolls 148, with each cycle of operation of the press.

The operation of the modified construction shown in Figs. 27 and 28 imparts a slow, continuous movement to the shaft 20 and the master disks 16, 17, 18 and 19 mounted thereon, instead of the intermittent rotation accomplished by the step-by-step movement of the pawl 26 on the ratchet-gear 21. The essential functions and operations of the respective devices will be practically the same as in the intermittent rotative movements, and need not be repeated, since any slight changes in the setting of the different members constituting my feeder will be readily understood by those skilled in this art.

From all the foregoing it will be understood that a feeder has been provided which realizes and incorporates the various objects of invention and advantages hereinbefore set forth, together with other objects and advantages.

The invention, in its broadest aspects, is not limited to the particular constructions shown, nor to any particular constructions by which it has been or may be carried into effect, as many changes and alterations may be made in the constructions shown without departing from the main principles of the invention, and without sacrificing its chief advantages. In the appended claims I have used the terms "sheet" and "sheet feeding" to designate broadly any individual pieces of material, as distinguished from a continuous roll or web. My improved feeder may be used with any articles capable of being individually separated and segregated in predetermined order, and thereafter collated and fed to any machine for any desired purpose.

I claim as my invention:—

1. In a collating feeder, the combination with means for segregating a predetermined plurality of sheets of impression-receiving material from each of a plurality of separate piles and associating same in a common pile, of means for feeding the sheets from the common pile in proper succession.

2. In a collating feeder, the combination with means for segregating a predetermined plurality of sheets of impression-receiving material from each of a plurality of separate piles and associating same in a common pile in predetermined order, of means for feeding the sheets from the common pile to a printing or like machine.

3. In a collating feeder, the combination with means for segregating a predetermined plurality of sheets of impression-receiving material from each of a plurality of separate piles and associating same in a common pile, of means for feeding the sheets from the common pile to a printing or like machine with each cycle of operation of the machine.

4. In a collating feeder, the combination with means for segregating a predetermined plurality of sheets of impression-receiving material from each of a plurality of separate piles and associating same in a common pile in predetermined order, of means for feeding the sheets from the common pile to a printing or like machine with each cycle of operation of the machine.

5. In a collating feeder, the combination with means for segregating a predetermined plurality of sheets of impression-receiving material from each of a plurality of separate piles and associating same in a common pile, of means for varying the respective numbers of separate sheets so fed from the different piles.

6. In a collating feeder, the combination with means for segregating a predetermined plurality of sheets of impression-receiving material from each of a plurality of separate piles and associating same in a common pile in predetermined order, of means for varying the respective numbers of separate sheets so fed from the different piles.

7. In a collating feeder, the combination with means for segregating a predetermined plurality of sheets of impression-receiving material from each of a plurality of separate piles and associating same in a common pile, of means for varying the respective numbers of separate sheets so fed from the different piles in each cycle of operation.

8. In a collating feeder, the combination with means for segregating a predetermined plurality of sheets of impression-receiving material from each of a plurality of separate piles and associating same in a common pile in predetermined order, of means for varying the respective numbers of separate sheets so fed from the different piles in each cycle of operation.

9. In a collating feeder, the combination with means for segregating a predetermined plurality of sheets of impression-receiving material from each of a plurality of separate piles and associating same in a common pile, of means for varying the respective numbers of separate sheets so fed from the different piles, and means for feeding the sheets from the common pile to a printing or like machine.

10. In a collating feeder, the combination with means for segregating a predetermined plurality of sheets of impression-receiving material from each of a plurality of separate piles and associating same in a common pile in predetermined order, of means for varying the respective numbers of separate sheets so fed from the different piles, and means for feeding the sheets from the common pile to a printing or like machine.

11. In a collating feeder, the combination with means for segregating a predetermined plurality of sheets of impression-receiving material from each of a plurality of separate piles and associating same in a common pile, of means for varying the respective numbers of separate sheets so fed from the different piles, and means for feeding the sheets from the common pile to a printing or like machine with each cycle of operation of the machine.

12. In a collating feeder, the combination with means for segregating a predetermined plurality of sheets of impression-receiving material from each of a plurality of separate piles and associating same in a common pile in predetermined order, of means for varying the respective numbers of separate sheets so fed from the different piles, and means for feeding the sheets from the common pile to a printing or like machine with each cycle of operation of the machine.

13. In a collating feeder, the combination with means for segregating a predetermined plurality of sheets of impression-receiving material from each of a plurality of separate piles, of means for moving the segregated piles toward a common pile, and means for feeding the sheets from the common pile to a printing or like machine.

14. In a collating feeder, the combination with means for segregating a predetermined plurality of sheets of impression-receiving material from each of a plurality of separate piles, of means for moving the segregated piles toward a common pile in predetermined order, and means for feeding the sheets from the common pile to a printing or like machine.

15. In a collating feeder, the combination with means for segregating a predetermined plurality of sheets of impression-receiving material from each of a plurality of separate piles, of means for moving the segregated piles toward a common pile, and means for feeding the sheets from the common pile to a printing or like machine with each cycle of operation of the machine.

16. In a collating feeder, the combination with means for segregating a predetermined plurality of sheets of impression-receiving material from each of a plurality of separate piles, of means for moving the segregated piles toward a common pile in predetermined order, and means for feeding the sheets from the common pile to a printing or like machine with each cycle of operation of the machine.

17. In a collating feeder, the combination with means for segregating a predetermined plurality of sheets of impression-receiving material from each of a plurality of separate piles, of means for varying the respective numbers of separate sheets so fed from the different piles, and means for moving the then segregated piles toward a common pile.

18. In a collating feeder, the combination with means for segregating a predetermined plurality of sheets of impression-receiving material from each of a plurality of separate piles in predetermined order, of means for varying the respective numbers of separate sheets so fed from the different piles, and means for moving the then segregated piles toward a common pile.

19. In a collating feeder, the combination with means for segregating a predetermined plurality of sheets of impression-receiving material from each of a plurality of separate piles, of means for varying the respective numbers of separate sheets so fed from the different piles, and means for moving the then segregated piles toward a common pile in predetermined order.

20. In a collating feeder, the combination with means for segregating a predetermined plurality of sheets of impression-receiving material from each of a plurality of separate piles in predetermined order, of means for varying the respective numbers of separate sheets so fed from the different piles, and means for moving the then segregated piles toward a common pile in predetermined order.

21. In a collating feeder, the combination with means for segregating a predetermined plurality of sheets of impression-receiving material from each of a plurality of separate piles, of means for varying the respective numbers of separate sheets so fed from the different piles, means for moving the then segregated piles toward a common pile, and means for feeding the sheets from the common pile to a printing or like machine.

22. In a collating feeder, the combination with means for segregating a predetermined plurality of sheets of impression-receiving material from each of a plurality of separate piles in predetermined order, of means for varying the respective numbers of separate sheets so fed from the different piles, means for moving the then segregated piles toward a common pile, and means for feeding the sheets from the common pile to a printing or like machine.

23. In a collating feeder, the combination with means for segregating a predetermined plurality of sheets of impression-receiving material from each of a plurality of separate piles, of means for varying the respective numbers of separate sheets so fed from the different piles, means for moving the then segregated piles toward a common pile in predetermined order, and means for feeding the sheets from the common pile to a printing or like machine.

24. In a collating feeder, the combination with means for segregating a predetermined plurality of sheets of impression-receiving material from each of a plurality of separate piles in predetermined order, of means for varying the respective numbers of separate sheets so fed from the different piles, means for moving the then segregated piles toward a common pile in predetermined order, and means for feeding the sheets from the common pile to a printing or like machine.

25. In a collating feeder, the combination with means for segregating a predetermined plurality of sheets of impression-receiving material from each of a plurality of separate piles, of means for varying the respective numbers of separate sheets so fed from the different piles, means for moving the then segregated piles toward a common pile, and means for feeding the sheets from the common pile to a printing or like machine with each cycle of operation of the machine.

26. In a collating feeder, the combination with means for segregating a predetermined plurality of sheets of impression-receiving material from each of a plurality of separate piles in predetermined order, of means for varying the respective numbers of separate sheets so fed from the different piles, means for moving the then segregated piles toward a common pile, and means for feeding the sheets from the common pile to a printing or like machine with each cycle of operation of the machine.

27. In a collating feeder, the combination with means for segregating a predetermined plurality of sheets of impression-receiving material from each of a plurality of separate piles, of means for varying the respective numbers of separate sheets so fed from the different piles, means for moving the then segregated piles toward a common pile in predetermined order, and means for feeding the sheets from the common pile to a printing or like machine with each cycle of operation of the machine.

28. In a collating feeder, the combination with means for segregating a predetermined plurality of sheets of impression-receiving material from each of a plurality of separate piles in predetermined order, of means for varying the respective numbers of separate sheets so fed from the different piles, means for moving the then segregated piles toward a common pile in predetermined order, and means for feeding the sheets from the common pile to a printing or like machine with each cycle of operation of the machine.

29. In a collating feeder, the combination with means for segregating sheets of impression-receiving material from a plurality of separate piles, of means for associating and moving certain segregated piles in one direction to a common pile, and means for associating and moving other segregated piles in another direction to the common pile.

30. In a collating feeder, the combination with means for segregating sheets of impression-receiving material from a plurality of separate piles, of means for associating and moving certain segregated piles in one direction to a common pile, and means for associating and moving other segregated piles in another direction to the common pile, both said pile-moving means operating in predetermined order.

31. In a collating feeder, the combination with means for segregating sheets of impression-receiving material from a plurality of separate piles in predetermined order, of means for associating and moving certain segregated piles in one direction to a common pile, and means for associating and moving other segregated piles in another direction to the common pile.

32. In a collating feeder, the combination with means for segregating sheets of impression-receiving material from a plurality of separate piles in predetermined order, of means for associating and moving certain segregated piles in one direction to a common pile, and means for associating and moving other segregated piles in another direction to the common pile, both said pile-moving means operating in predetermined order.

33. In a collating feeder, the combination with means for segregating sheets of impression-receiving material from a plurality of separate piles, of means for varying the respective numbers of separate sheets so fed from the different piles, means for associating and moving certain segregated piles in one direction to a common pile, and means for associating and moving other segregated piles in another direction to the common pile.

34. In a collating feeder, the combination with means for segregating sheets of impression-receiving material from a plurality of separate piles in predetermined order, of means for varying the respective numbers of separate sheets so fed from the different piles, means for associating and moving certain segregated piles in one direction to a common pile, and means for associating and moving other segregated piles in another direction to the common pile.

35. In a collating feeder, the combination with means for segregating sheets of impression-receiving material from a plurality of separate piles, of means for varying the respective numbers of separate sheets so fed from the different piles, means for associating and moving certain segregated piles in one direction to a common pile, and means for associating and moving other segregated piles in another direction to the common pile, both said pile-moving means operating in predetermined order.

36. In a collating feeder, the combination with means for segregating sheets of impression-receiving material from a plurality of separate piles in predetermined order, of means for varying the respective numbers of separate sheets so fed from the different piles, means for associating and moving certain segregated piles in one direction to a common pile, and means for associating and moving other segregated piles in another direction to the common pile, both said pile-moving means operating in predetermined order.

37. In a collating feeder, the combination with means for segregating sheets of impression-receiving material from a plurality of separate piles, of means for moving certain segregated piles in one direction to a common pile, means for moving other segregated piles in another direction to the common pile, and means for feeding the sheets from the common pile to a printing or like machine.

38. In a collating feeder, the combination with means for segregating sheets of impression-receiving material from a plurality of separate piles in predetermined order, of means for moving certain segregated piles in one direction to a common pile, means for moving other segregated piles in another direction to the common pile, and means for feeding the sheets from the common pile to a printing or like machine.

39. In a collating feeder, the combination with means for segregating sheets of impression-receiving material from a plurality of separate piles, of means for moving certain segregated piles in one direction to a common pile, means for moving other segregated piles in another direction to the common pile, both said pile-moving means operating in predetermined order, and means for feeding the sheets from the common pile to a printing or like machine.

40. In a collating feeder, the combination with means for segregating sheets of impression-receiving material from a plurality of separate piles in predetermined order, of means for moving certain segregated piles in one direction to a common pile, means for moving other segregated piles in another direction to the common pile, both said pile-moving means operating in predetermined order, and means for feeding the sheets from the common pile to a printing or like machine.

41. In a collating feeder, the combination with means for segregating sheets of impression-receiving material from a plurality of separate piles, of means for moving certain segregated piles in one direction to a common pile, means for alternately moving other segregated piles in another direction to the common pile, and means for feeding the sheets from the common pile to a printing or like machine.

42. In a collating feeder, the combination with means for segregating sheets of impression-receiving material from a plurality of separate piles in predetermined order, of means for moving certain segregated piles in one direction to a common pile, means for alternately moving other segregated piles in another direction to the common pile, and means for feeding the sheets from the common pile to a printing or like machine.

43. In a collating feeder, the combination with means for segregating sheets of impression-receiving material from a plurality of separate piles, of means for moving certain segregated piles in one direction to a common pile, means for alternately moving other segregated piles in another direction to the common pile, both said pile-moving means operating in predetermined order, and means for feeding the sheets from the common pile to a printing or like machine.

44. In a collating feeder, the combination with means for segregating sheets of impression-receiving material from a plurality of separate piles in predetermined order, of means for moving certain segregated piles in one direction to a common pile, means for alternately moving other segregated piles in another direction to the common pile, both said pile-moving means operating in predetermined order, and means for feeding the sheets from the common pile to a printing or like machine.

45. In a collating feeder, the combination with means for segregating sheets of impression-receiving material from a plurality of separate piles, of means for moving certain segregated piles in one direction to a common pile, means for moving other separated piles in another direction to the common pile, and means for feeding the sheets from the common pile to a printing or like machine with each cycle of operation of the machine.

46. In a collating feeder, the combination with means for segregating sheets of impression-receiving material from a plurality of separate piles in predetermined order, of means for moving certain segregated piles in one direction to a common pile, means for moving other segregated piles in another direction to the common pile, and means for feeding the sheets from the common pile to a printing or like machine with each cycle of operation of the machine.

47. In a collating feeder, the combination with means for segregating sheets of impression-receiving material from a plurality of separate piles, of means for moving certain segregated piles in one direction to a common pile, means for moving other segregated piles in another direction to the common pile, both said pile-moving means operating in predetermined order, and means for feeding the sheets from the common pile to a printing or like machine with each cycle of operation of the machine.

48. In a collating feeder, the combination with means for segregating sheets of impression-receiving material from a plurality of separate piles in predetermined order, of means for moving certain segregated piles in one direction to a common pile, means for moving other segregated piles in another direction to the common pile, both said pile-moving means operating in predetermined order, and means for feeding the sheets from the common pile to a printing or like machine with each cycle of operation of the machine.

49. In a collating feeder, the combination with means for segregating sheets of impression-receiving material from a plurality of separate piles, of means for varying the respective numbers of separate sheets so fed from the different piles, means for moving certain segregated piles in one direction to a common pile, means for moving other segregated piles in another direction to the common pile, and means for feeding the sheets from the common pile to a printing or like machine.

50. In a collating feeder, the combination with means for segregating sheets of impression-receiving material from a plurality of separate piles in predetermined order, of means for varying the respective numbers of separate sheets so fed from the different piles, means for moving certain segregated piles in one direction to a common pile, means for moving other segregated piles in another direction to the common pile, means for actuating the pile-moving means in alternate succession, and means for feeding the sheets from the common pile to a printing or like machine with each cycle of operation of the machine.

51. In a collating feeder, the combination with means for segregating sheets of impression-receiving material from a plurality of separate piles in predetermined order, of means for moving certain segregated piles in one direction to a common pile, means for moving other segregated piles in another direction to the common pile, means for actuating the pile-moving means in alternate succession, and means for feeding the sheets from the common pile to a printing or like machine with each cycle of operation of the machine.

52. In a collating feeder, the combination with a plurality of feeding members to segregate and carry sheets of impression-receiving material to a like plurality of separate piles, of means for actuating certain sets of said feeding members while other sets of said members are held in idle position, means for alternating the action of the respective sets of said feeding members, and means for assembling the then segregated piles in a common pile.

53. In a collating feeder, the combination with a plurality of feeding members to segregate and carry sheets of impression-receiving material to a like plurality of separate piles, of means for actuating certain sets of said feeding members at predetermined intervals while other sets of said members are held in idle position, means for alternating the action of the respective sets of said feeding members, and means for assembling the then segregated piles in a common pile.

54. In a collating feeder, the combination with a plurality of feeding members to segregate and carry sheets of impression-receiving material to a like plurality of separate piles, of means for actuating certain sets of said feeding members while other sets of said members are held in idle position, means for alternating the action of the respective sets of said feeding members with each cycle of operation of said members, and means for assembling the then segregated piles in a common pile.

55. In a collating feeder, the combination with a plurality of feeding members to segregate and carry sheets of impression-receiving material to a like plurality of separate piles, of means for actuating certain sets of said feeding members at predetermined intervals while other sets of said members are held in idle position, means for alternating the action of the respective sets of said feeding members with each cycle of operation of said members and means for assembling the then segregated piles in a common pile.

56. In a collating feeder, the combination with a plurality of feeding members to segregate and carry sheets of impression-receiving material to a like plurality of separate piles, of means for actuating certain sets of said feeding members while other sets of said members are held in idle position, both sets of members operating at predetermined intervals, means for alternating the action of the respective sets of said feeding members, and means for assembling the then segregated piles in a common pile.

57. In a collating feeder, the combination with means for segregating sheets of impression-receiving material from a plurality of separate piles, of means for moving certain segregated piles in one direction to a common pile, means for moving other segregated piles in another direction to the common pile, and means for alternating the movement of said pile-moving means.

58. In a collating feeder, the combination with means for segregating sheets of impression-receiving material from a plurality of separate piles in predetermined order, of means for moving certain segregated piles in one direction to a common pile, means for moving other segregated piles in another direction to the common pile, and means for alternating the movement of said pile-moving means.

59. In a collating feeder, the combination with means for segregating sheets of impression-receiving material from a plurality of separate piles, of means for moving one of the segregated piles upon another of said piles.

60. In a collating feeder, the combination with means for segregating sheets of impression-receiving material from a plurality of separate piles in predetermined order, of means for moving one of the segregated piles upon another of said piles.

61. In a collating feeder, the combination with means for segregating sheets of impression-receiving material from a plurality of separate piles, of means for moving one of the segregated piles upon another of said piles, and means for compressing the second pile during the movement of the first pile.

62. In a collating feeder, the combination with means for segregating sheets of impression-receiving material from a plurality of segregated piles in predetermined order, of means for moving one of the separate piles upon another of said piles, and means for compressing the second pile during the movement of the first pile.

63. In a collating feeder, the combination with means for segregating sheets of impression-receiving material from a plurality of separate piles, of means for moving one of the segregated piles upon another of said piles, and means for moving the superimposed piles to a common pile.

64. In a collating feeder, the combination with means for segregating sheets of impression-receiving material from a plurality of segregated piles in predetermined order, of means for moving one of the separate piles upon another of said piles, and means for moving the superimposed piles to a common pile.

65. In a collating feeder, the combination with means for segregating sheets of impression-receiving material from a plurality of separate piles, of means for moving one of the segregated piles upon another of said piles, means for compressing the second pile during the movement of the first pile, and means for moving the superimposed piles to a common pile.

66. In a collating feeder, the combination with means for segregating sheets of impression-receiving material from a plurality of segregated piles in predetermined order, of means for moving one of the separate piles upon another of said piles, means for compressing the second pile during the movement of the first pile, and means for moving the superimposed piles to a common pile.

67. In a collating feeder, the combination with means for segregating sheets of impression-receiving material from a plurality of separate piles, of means for moving one of the segregated piles upon another of said piles, means for moving the superimposed piles to a common pile, and means for feeding the sheets from the common pile to a printing or like machine.

68. In a collating feeder, the combination with means for segregating sheets of impression-receiving material from a plurality of segregated piles in predetermined order, of means for moving one of the separate piles upon another of said piles, means for moving the superimposed piles to a common pile, and means for feeding the sheets from the common pile to a printing or like machine.

69. In a collating feeder, the combination with means for segregating sheets of impression-receiving material from a plurality of separate piles, of means for moving one of the segregated piles upon another of said piles, means for compressing the second pile during the movement of the first pile, means for moving the superimposed piles to a common pile, and means for feeding the sheets from the common pile to a printing or like machine.

70. In a collating feeder, the combination with means for segregating sheets of impression-receiving material from a plurality of segregated piles in predetermined order, of means for moving one of the separate piles upon another of said piles, means for compressing the second pile during the movement of the first pile, means for moving the superimposed piles to a common pile, and means for feeding the sheets from the common pile to a printing or like machine.

71. In a collating feeder, the combination with a plurality of feeding members to segregate and carry sheets of impression-receiving material from a like plurality of separate piles, of means for actuating certain of said feeding members at predetermined intervals, and means for assembling the segregated piles in a common pile.

72. In a collating feeder, the combination with a plurality of feeding members to segregate and carry sheets of impression-receiving material from a like plurality of separate piles, of automatic means for actuating certain of said feeding members at predetermined intervals, and means for assembling the segregated piles in a common pile.

73. In a collating feeder, the combination with a plurality of feeding members to segregate and carry sheets of impression-receiving material from a like plurality of separate piles, of means for maintaining in idle position, while other of said members are in action, certain of said feeding members at predetermined intervals, and means for assembling the segregated piles in a common pile.

74. In a collating feeder, the combination with a plurality of feeding members to segregate and carry sheets of impression-receiving material from a like plurality of separate piles, of automatic means for maintaining, in idle position, while other of said members are in action, certain of said feeding members at predetermined intervals, and means for assembling the segregated piles in a common pile.

75. In a collating feeder, the combination with a plurality of feeding members to segregate and carry sheets of impression-receiving material from a like plurality of separate piles, of means for actuating certain of said feeding members at predetermined intervals, means for maintaining in idle position the other feeding members while the feeding members first-mentioned are in action, and means for assembling the segregated piles in a common pile.

76. In a collating feeder, the combination with a plurality of feeding members to segregate and carry sheets of impression-receiving material from a like plurality of separate piles, of automatic means for actuating certain of said feeding members at predetermined intervals, means for maintaining in idle position the other feeding members while the feeding members first-mentioned are in action, and means for assembling the segregated piles in a common pile.

77. In a collating feeder, the combination with a plurality of feeding members to segregate and carry sheets of impression-receiving material from a like plurality of separate piles, of means for actuating certain of said feeding members at predetermined intervals, means for maintaining in idle position the other feeding members while the feeding members first-mentioned are in action, means for varying the respective numbers of sheets so fed from the different piles in predetermined order, and means for assembling the segregated piles in a common pile.

78. In a collating feeder, the combination with a plurality of feeding members to segregate and carry sheets of impression-receiving material from a like plurality of separate piles, of automatic means for actuating certain of said feeding members at predetermined intervals, means for maintaining in idle position the other feeding members while the feeding members first-mentioned are in action, means for varying the respective numbers of sheets so fed from the different piles in predetermined order, and means for assembling the segregated piles in a common pile.

79. In a collating feeder, the combination with a plurality of feeding members to segregate and carry sheets of impression-receiving material from a like plurality of separate piles, of means, comprising an intermittently rotating ratchet and coöperating pawl, for controlling the operation of said feeding members, and means for assembling the segregated piles in a common pile.

80. In a collating feeder, the combination with a plurality of feeding members to segregate and carry sheets of impression-receiving material from a like plurality of separate piles, of means, comprising an intermittently rotating ratchet and coöperating pawl, for controlling the operation of said feeding members in predetermined order, means for effecting a locking engagement between said ratchet and pawl, and means for assembling the segregated piles in a common pile.

81. In a collating feeder, the combination with a plurality of feeding members to segregate and carry sheets of impression-receiving material from a like plurality of separate piles, of means, comprising an intermittently rotating ratchet and coöperating pawl, for controlling the operation of said feeding members in predetermined order, means, actuated by said controlling means, for effecting a locking engagement between said ratchet and pawl, and means for assembling the segregated piles in a common pile.

82. In a collating feeder, the combination with a plurality of feeding members to segregate and carry sheets of impression-receiving material from a like plurality of separate piles, of means actuated by the feeder for controlling the operation of said feeding members, and means for assembling the segregated piles in a common pile.

83. In a collating feeder, the combination with a plurality of feeding members to segregate and carry sheets of impression-receiving material from a like plurality of separate piles, of rotatable means actuated by the feeder for controlling the operation of said feeding members, said means being rotated once in each cycle of operation of said feeding members, and means for assembling the separate piles in a common pile.

84. In a collating feeder, the combination with means for segregating sheets of impression-receiving material from a plurality of separate piles and associating same in a common pile, of means for feeding the sheets from the common pile to a printing or like machine, and means, actuated by said machine, for controlling the operation of said feeding means.

85. In a collating feeder, the combination with means for segregating sheets of impression-receiving material from a plurality of separate piles and associating same in a common pile, of means for feeding the sheets from the common pile to a printing or like machine, and rotatable means, actuated by said machine, for controlling the operation of said feeding means, said means being rotated once in each cycle of operation of said feeding means.

86. In a collating feeder, the combination with means for segregating sheets of impression-receiving material from a plurality of separate piles, of means for moving the segregated piles toward a common pile, and means for alining the segregated piles before assembled in the common pile.

87. In a collating feeder, the combination with means for segregating sheets of impression-receiving material from a plurality of separate piles, of means for moving the segregated piles toward a common pile, and means, actuated by said pile-moving means, for alining the segregated piles before assembled in the common pile.

88. In a collating feeder, the combination with means for segregating sheets of impression-receiving material from a plurality of separate piles, of means for moving certain segregated piles in one direction to a common pile, means for moving other segregated piles in another direction to the common pile, and means for alining the segregated piles before assembled in the common pile.

89. In a collating feeder, the combination with means for segregating sheets of impression-receiving material from a plurality of separate piles, of means for moving certain segregated piles in one direction to a common pile, means for moving other segregated piles in another direction to the common pile, both said pile-moving means operating in predetermined order, and means for alining the segregated piles before assembled in the common pile.

90. In a collating feeder, the combination with means for segregating sheets of impression-receiving material from a plurality of separate piles, of means for moving certain segregated piles in one direction to a common pile, means for moving other segregated piles in another direction to the common pile, and means, actuated by said pile-moving means, for alining the segregated piles before assembled in the common pile.

91. In a collating feeder, the combination with means for segregating sheets of impression-receiving material from a plurality of separate piles, of means for moving certain segregated piles in one direction to a common pile, means for moving other segregated piles in another direction to the common pile, both said pile-moving means operating in predetermined order, and means, actuated by said pile-moving means, for alining the segregated piles before assembled in the common pile.

92. In a collating feeder, the combination with means for segregating sheets of impression-receiving material from a plurality of separate piles, of means for moving one of the segregated piles upon another of said piles, and means for alining the superimposed piles.

93. In a collating feeder, the combination with means for segregating sheets of impression-receiving material from a plurality of separate piles, of means for moving one of the segregated piles upon another of said piles, means for compressing the second pile during the movement of the first pile, and means for alining the superimposed piles.

94. In a collating feeder, the combination with means for segregating sheets of impression-receiving material from a plurality of separate piles, of means for moving one of the segregated piles upon another of said piles, means for alining the superimposed piles, and means for moving the superimposed piles to a common pile.

95. In a collating feeder, the combination with means for segregating sheets of impression-receiving material from a plurality of separate piles, of means for moving one of the segregated piles upon another of said piles, means for compressing the second pile during the movement of the first pile, means for alining the superimposed piles, and means for moving the superimposed piles to a common pile.

96. In a collating feeder, the combination with a plurality of feeding members to segregate and carry sheets of impression-receiving material from a like plurality of separate piles, of means for actuating certain of said members while other of said members are held in idle position, means for varying the respective numbers of sheets so fed from the separate piles, means for associating and moving certain segregated piles in one direction to a common pile, means for associating and moving other segregated piles in another direction to the common pile, and means for operating said pile-moving means in alternate succession.

97. In a collating feeder, the combination with a plurality of feeding members to segregate and carry sheets of impression-receiving material from a like plurality of separate piles, of means for actuating certain of said members while other of said members are held in idle position, both said sets of feeding members operating in predetermined alternate succession, means for varying the respective numbers of sheets so fed from the separate piles, means for associating and moving certain segregated piles in one direction to a common pile, means for associating and moving other segregated piles in another direction to the common pile, and means for operating said pile-moving means in alternate succession.

98. In a collating feeder, the combination with a plurality of feeding members to segregate and carry sheets of impression-receiving material from a like plurality of separate piles, of means for actuating certain of said members while other of said members are held in idle position, means for varying the respective numbers of sheets so fed from the separate piles, means for associating and moving certain segregated piles in one direction to a common pile, means for associating and moving other segregated piles in another direction to the common pile, means for operating said pile-moving means in alternate succession, and means for alining said segregated piles before assembled in the common pile.

99. In a collating feeder, the combination with a plurality of feeding members to segregate and carry sheets of impression-receiving material from a like plurality of separate piles, of means for actuating certain of said members while other of said members are held in idle position, means for varying the respective numbers of sheets so fed from the separate piles, means for associating and moving certain segregated piles in one direction to a common pile, means for associating and moving other segregated piles in another direction to the common pile, means for operating said pile-moving means in alternate succession, means for alining said segregated piles before assembled in the common pile, and means for feeding the sheets from the common pile to a printing or like machine.

100. In a collating feeder, the combination with a plurality of feeding members to segregate and carry sheets of impression-receiving material from a like plurality of separate piles, of means for actuating certain of said members while other of said members are held in idle position, means for varying the respective numbers of sheets so fed from the separate piles, means for associating and moving certain segregated piles in one direction to a common pile, means for associating and moving other segregated piles in another direction to the common pile, means for operating said pile-moving means in alternate succession, means for alining said segregated piles before assembled in the common pile, and means for feeding the sheets from the common pile to a printing or like machine with each cycle of operation of the machine.

101. In a collating feeder, the combination with a plurality of feeding members to segregate and carry sheets of impression-receiving material from a like plurality of separate piles, of means for varying the respective numbers of sheets so fed from the different piles, means for actuating certain of said members while other of said members are held in idle position, means for moving one of said segregated piles upon another of said piles, means for compressing the second of said piles during the movement of the first pile, and means for moving the superimposed piles to a common pile.

102. In a collating feeder, the combination with a plurality of feeding members to segregate and carry sheets of impression-receiving material from a like plurality of separate piles, of means for varying the respective numbers of sheets so fed from the different piles, means for actuating certain of said members while other of said members are held in idle position, means for moving one of said segregated piles upon another of said piles, means for compressing the second of said piles during the movement of the first pile, means for alining the superimposed piles, and means for moving the superimposed piles to a common pile.

103. In a collating feeder, the combination with a plurality of feeding members to segregate and carry sheets of impression-receiving material from a like plurality of separate piles, of means for varying the respective numbers of sheets so fed from the different piles, means for actuating certain of said members while other of said members are held in idle position, means for moving one of said segregated piles upon another of said piles, means for compressing the second of said piles during the movement of the first pile, means for moving the superimposed piles to a common pile, and means for feeding the sheets from the common pile to a printing or like machine.

104. In a collating feeder, the combination with a plurality of feeding members to segregate and carry sheets of impression-receiving material from a like plurality of separate piles, of means for varying the respective numbers of sheets so fed from the different piles, means for actuating certain of said members while other of said members are held in idle position, means for moving one of said segregated piles upon another of said piles, means for compressing the second of said piles during the movement of the first pile, means for alining the superimposed piles, means for moving the superimposed piles to a common pile, and means for feeding the sheets from the common pile to a printing or like machine.

105. The combination with a printing or like machine, of means for feeding sheets from a plurality of separate piles and associating same in a common pile to be fed to said machine, means for detecting the failure of any of the sheet-feeding means to feed a sheet from its pile, and means actuated by said detecting means for stopping the printing machine without throwing off the impression.

106. The combination with a printing or like machine, of means for feeding sheets from a plurality of separate piles and associating same in a common pile to be fed to said machine, means, actuated by said feeding means, for detecting the failure of any of the sheet-feeding means to feed a sheet from its pile, and means actuated by said detecting means for stopping the printing machine without throwing off the impression.

107. The combination with a printing or like machine, of means for feeding sheets from a plurality of separate piles and associating same in a common pile to be fed to said machine, means for detecting the failure of any of the sheet-feeding means to feed a sheet from its pile, means for varying the number of sheets fed from the respective piles to the common pile, and means actuated by said detecting means for stopping the printing machine without throwing off the impression.

108. The combination with a printing or like machine, of means for feeding sheets from a plurality of separate piles and associating same in a common pile to be fed to said machine, means, actuated by said feeding means, for detecting the failure of any of the sheet-feeding means to feed a sheet from its pile, means for varying the number of sheets fed from the respective piles to the common pile, and means actuated by said detecting means for stopping the printing machine without throwing off the impression.

CARL G. PRITCHARD.

Witnesses:
A. D. Loop,
C. E. Zipf.